United States Patent [19]

Alsenz

[11] Patent Number: 4,593,533

[45] Date of Patent: Jun. 10, 1986

[54] METHOD AND APPARATUS FOR DETECTING AND CONTROLLING THE FORMATION OF ICE OR FROST

[76] Inventor: Richard H. Alsenz, 2402 Creekmeadows, Missouri City, Tex. 77459

[21] Appl. No.: 846,573

[22] Filed: Oct. 28, 1977

Related U.S. Application Data

[63] Continuation of Ser. No. 529,728, Dec. 5, 1974, abandoned.

[51] Int. Cl.⁴ .................... F25D 21/02; G08B 19/02
[52] U.S. Cl. ................................. 62/140; 62/151; 250/340; 340/583
[58] Field of Search ................... 62/137–140, 62/151, 128; 340/583, 580; 250/339, 340, 239, 231 SE; 73/170 R; 357/19; 356/73

[56] References Cited

U.S. PATENT DOCUMENTS

| | | |
|---|---|---|
| 2,371,259 | 3/1945 | Patterson . |
| 2,414,520 | 1/1947 | Greenwald . |
| 2,428,667 | 10/1947 | Henriquez ........................ 62/140 X |
| 2,517,330 | 8/1950 | Marenholtz . |
| 2,849,617 | 8/1958 | Karasek ............................. 250/43.5 |
| 2,866,900 | 12/1958 | Busignies et al. .................. 250/43.5 |
| 2,875,140 | 2/1959 | Sikina ................................ 204/143 |
| 3,017,512 | 1/1962 | Wolbert . |
| 3,076,723 | 2/1963 | Covington et al. ............... 117/93.31 |
| 3,188,828 | 6/1965 | Wayne ................................ 62/140 |
| 3,280,577 | 10/1966 | Kobayashi et al. .................. 62/140 |
| 3,395,278 | 7/1968 | McDivitt . |
| 3,439,178 | 4/1969 | Rottmann .......................... 250/222 |
| 3,544,222 | 12/1970 | Jannasch et al. ................... 356/161 |
| 3,588,496 | 1/1971 | Snowman ........................... 356/436 |
| 3,614,419 | 10/1971 | Daughton ....................... 250/223 R |
| 3,694,658 | 9/1972 | Watson et al. ................ 250/219 DF |
| 3,732,016 | 5/1973 | Deshayes et al. .................... 356/161 |
| 3,744,916 | 7/1973 | Bey et al. ............................ 356/161 |
| 3,822,560 | 7/1974 | Hansen et al. ........................ 62/140 |
| 3,910,701 | 10/1975 | Henderson ......................... 356/73 |
| 3,946,286 | 3/1976 | Kinnunen et al. ............... 340/234 X |

OTHER PUBLICATIONS

The Light Activated SCR, Howell.
Optical Methods in Ultracentrifugation, Electrophoresis of Diffusion, Lloyd, 7/1972.

*Primary Examiner*—William E. Wayner
*Attorney, Agent, or Firm*—Arnold, White & Durkee

[57] ABSTRACT

In one exemplar embodiment, a method and apparatus are disclosed for detecting the accumulation of frost on the evaporator coils of refrigerating equipment. An emitter or source of electromagnetic radiation having a selected narrow band of wavelengths and a selected intensity directs the electromagnetic radiation at the frost. A detector, spaced from the frost and emitter, receives the narrow band of electromagnetic radiation and detects changes in the intensity of the radiation due to absorption or scattering of the radiation by the frost in a relation proportional to the thickness of the frost. Control means responding to the detected change in intensity of the radiation is provided to initiate a defrost cycle and control the accumulation of the frost on the evaporator coil surfaces. Other embodiments of the invention include a liquid level detector and a physical state phase change detector.

18 Claims, 25 Drawing Figures

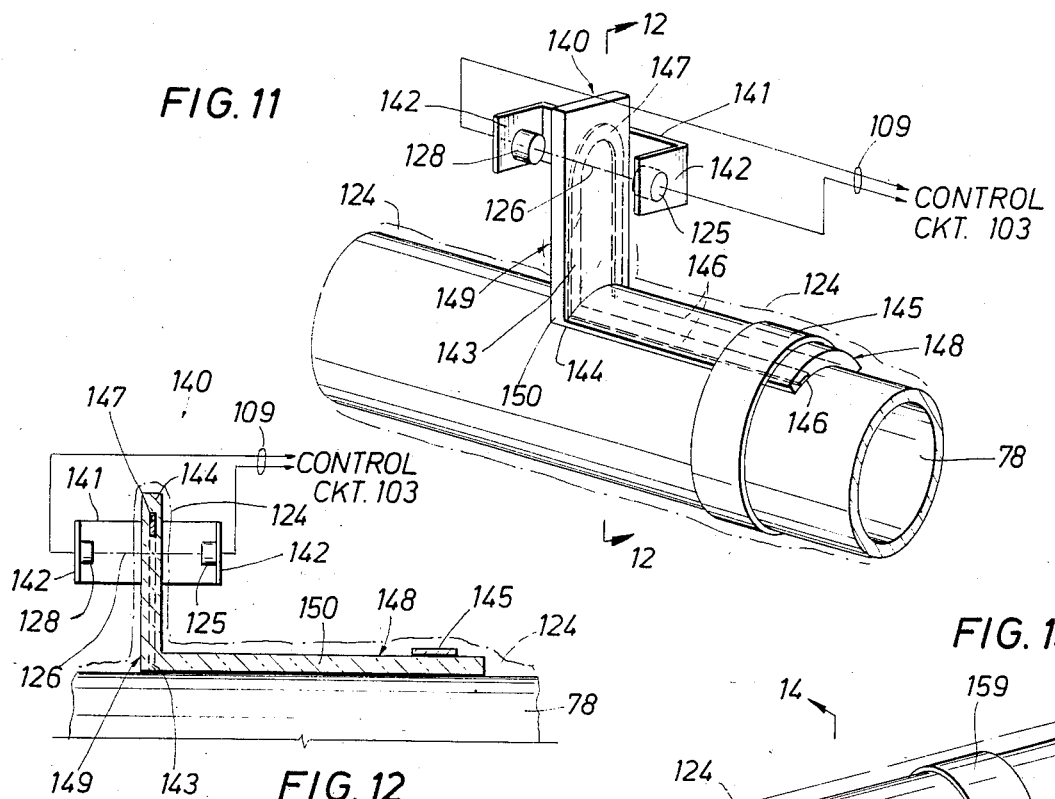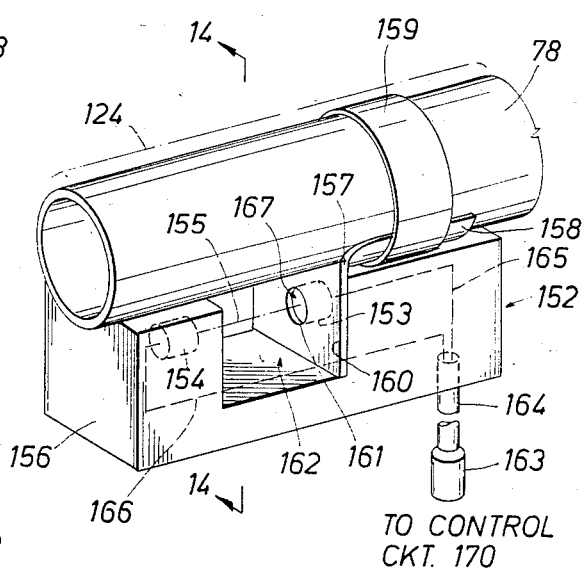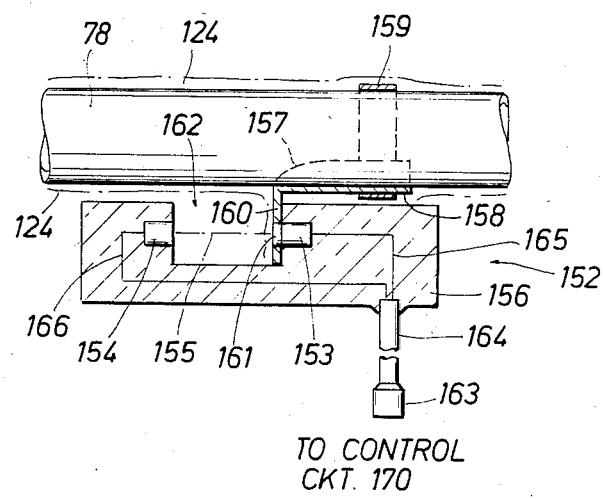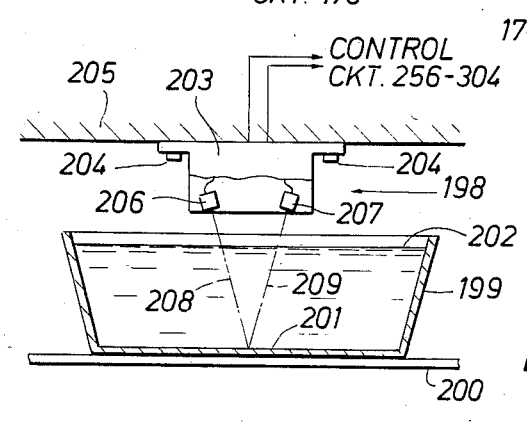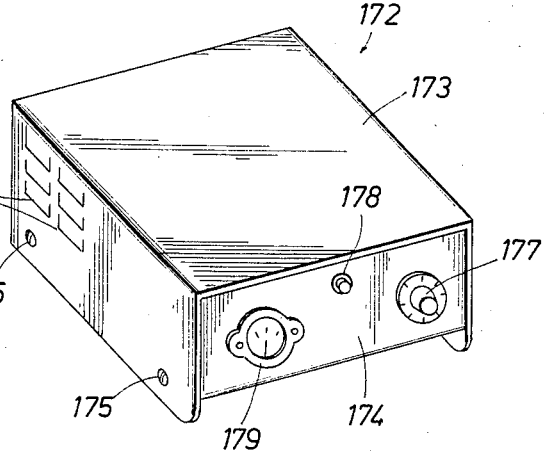

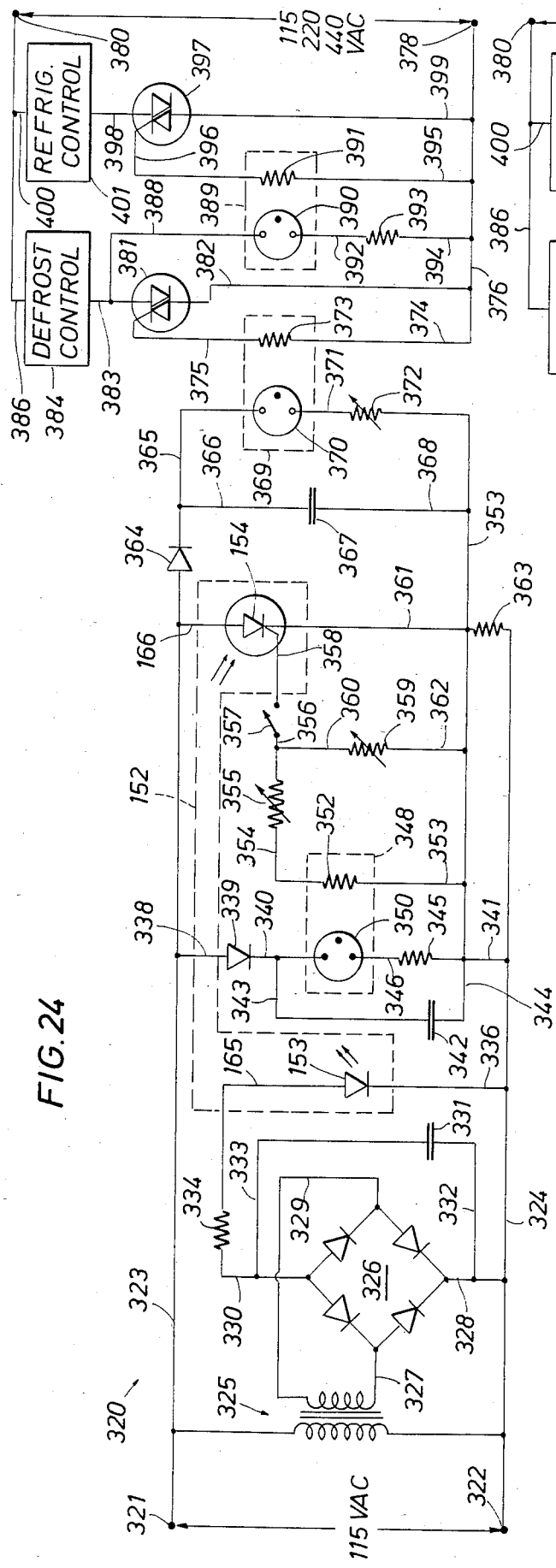
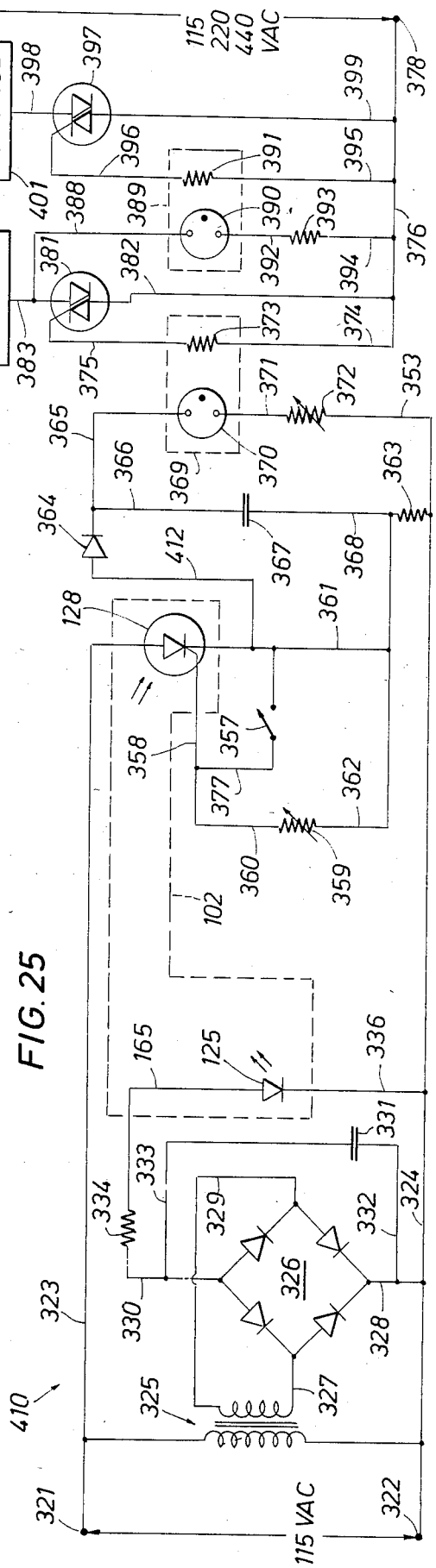
FIG.24
FIG.25

METHOD AND APPARATUS FOR DETECTING AND CONTROLLING THE FORMATION OF ICE OR FROST

This is a continuation of application Ser. No. 529,728, filed Dec. 5, 1974, now abandoned.

BACKGROUND OF THE INVENTION

This invention relates generally to methods and apparatus for detecting and controlling the accumulation or buildup of a substance on a selected surface, and more particularly relates to methods and apparatus for detecting and controlling the buildup or ice or frost on a refrigerated surface. In addition, the invention relates to processes and apparatus for preventing frost formation on a refrigerated surface.

In modern refrigerating equipment, the accumulation of ice or frost on the evaporator coils represents a problem. The accumulation or buildup of ice or frost insulates the air to be cooled or refrigerated from the cold refrigerating fluid circulating through the evaporator unit, resulting in a difficulty in maintaining the refrigerated space at the desired temperature.

The prior art has attempted several techniques to solve this problem. One conventional method widely used provides for a time clock which at some preselected time interval shuts off the compressor and turns on a thermal heating device adjacent to the evaporator coils to melt the ice or frost. The disadvantage of this technique is that ice or frost does not always accumulate at a constant rate, depending on the ambient humidity and temperature of the air, and most clock-actuated defrost systems defrost oftener than necessary, out of an abundance of caution, in order to eliminate all buildup of ice or frost. This defrosting on a regular time cycle, whether needed or not, independent of the quantity of accumulated ice or frost, is inefficient and wastes electrical power. Another method is simply to shut off the compressor for a predetermined length of time generally sufficient to allow the ice or frost to melt. However, this is also inefficient, since the turning off of the compressor permits the refrigerated space temperature to rise and again make the compressor and its motor work excessively to maintain the desired temperature. Other techniques use temperature sensitive devices to measure the temperature of the refrigerating medium and signal the defrost cycle upon a predetermined rise in the temperature as detected by the device. These temperature sensitive devices must be extremely sensitive to detect a small change in the temperature of the refrigerating medium which corresponds to a wide variation in the thickness of the accumulation of the ice or frost and thus are generally not very accurate.

Other methods of detection include optical means to detect buildup or accumulation of ice or frost. One such technique utilizes a light source and a photocell oriented to transmit and receive the light adjacent the evaporator coils or the fins associated with such coils. As the ice or frost accumulates, it physically blocks the passage of light to the photocell and can trigger appropriate ice or frost controlling apparatus. Such prior art is disclosed in the following U.S. Pat. Nos.: 2,297,370; 2,355,014; 2,377,926; 2,446,885; 3,120,108 and 3,188,828. None of these patents discloses the transmission of a beam of electromagnetic radiation of a preferred or selected wavelength and selected intensity through the ice or frost for measuring the change in intensity due to a change in the thickness of the ice or frost and resulting from absorption or scattering of the radiation by the frost. Of particular interest is the last enumerated U.S. Pat. No. 3,188,828, issued to Wayne on June 15, 1965. Wayne discloses apparatus for detecting ice utilizing a light source and photocell detector. The light source directs light upon a selected surface. The photocell is spaced from the light source and shielded from the light source. As ice forms on the selected surface, the light from the source reflects, scatters and refracts the light within the frost or ice, and a portion of such reflected, scattered and refracted light reaches the photocell and generates a signal in response thereto. In theory, as the ice builds up the amount of light reaching the photocell increases, and the signal produced by the photocell will increase in direct proportion to the increased thickness of the ice. This method depends on the transmission and scattering around a barrier. Since this method depends on the detection of photons which have traveled within the ice or frost and around a barrier and which eventually exit the frost at a secondary site, the change in intensity to be detected is small compared to the ambient background. Accordingly, the light measuring technique disclosed in U.S. Pat. No. 3,188,828 can be accurate only within rather narrow limits of application and is not suited to widespread use under varying applications of all types of refrigerating equipment, as is the case of the present invention.

Of interest also is U.S. Pat. No. 3,280,577 to Kobayashi, which discloses the use of a detector and a visible light source for directing the visible light through a layer of frost to the detector for producing electrical signals and means for controlling a defrosting operation in response to such electrical signals. The changes in the visible light passing through the ice or frost are caused by virtue of scattering and absorption of the visible light by the frost. However, the sensitivity of such a control disclosed in Kobayashi will be low since it is attempting to utilize a broad spectrum of visible light as a source and attempting to detect such visible light over a broad range, the limitations of which will be hereinafter further treated. Further, use of a high intensity incandescent light limits structural miniaturization and produces unwanted quantities of heat.

Accordingly, one primary feature of the present invention is to provide an ice or frost detecting apparatus of great accuracy, high reliability and low cost.

Another feature of the present invention is to provide an ice or frost detecting apparatus that can have universal application in all types of refrigerating equipment.

Yet another feature of the present invention is to provide an ice or frost detector that can accurately determine any thickness of ice or frost accumulated on the surface of evaporating coils of refrigerating equipment.

Still another feature of the present invention is to provide a control circuit, responsive to the ice or frost detector, that will control the buildup of ice or frost on the evaporator coils of refrigerating equipment.

Another feature of the present invention is to provide means responsive to a control circuit for melting ice or frost on evaporator coils that allows for continued operation of the refrigerating equipment during the defrost cycle.

Yet another feature of the present invention is to provide means for inhibiting the formation of ice or frost on selected evaporator coil surfaces of refrigerating equipment.

Still another feature of the present invention is to provide means for detecting the level of a liquid.

Another feature of the present invention is to provide means for detecting the physical change in state of a substance.

Yet another feature is to provide a means for the prevention of the condensation of water vapor on evaporator coils and the subsequent accumulation of frost or ice on a refrigerated surface.

Another feature is to provide a means for ice and frost control which has increased sensitivity over prior art devices.

SUMMARY OF THE INVENTION

The present invention remedies the problems of the prior art by providing a narrow band of detecting apparatus that includes an emitter or source of electromagnetic radiation having a selected wavelengths and a selected intensity that is absorbed or scattered by the substance to be detected, and a detector sensitive to the selected narrow band of wavelengths of the electromagnetic radiation for receiving the electromagnetic radiation after it has passed through the substance, such as ice or frost, for detecting the change in the intensity of the radiation in the narrow band due to absorption or scattering of the radiation by the substance. In one particular application, the emitter and detector are spaced apart and spaced from the surface of an evaporator coil. The narrow band of electromagnetic radiation is directed through the ice or frost, reflected from the coil surface through the ice or frost to impinge on the detector for measuring the change in intensity of the radiation due to absorption or scattering by the ice or frost in a relation proportional to the thickness of the ice or frost.

In another embodiment, the ice or frost is caused to form on a selected surface attached to the evaporator coil, the selected surface being transparent to the narrow band of electromagnetic radiation of selected wavelengths. The emitter and detector are spaced on opposite sides of the transparent selected surface, and the electromagnetic radiation is passed through the ice or frost and the selected surface for detection of the change in intensity or energy due to absorption or scattering by the ice or frost.

A control circuit is also provided for responding to the detected change in intensity of the eectromagnetic radiation for controlling defrost of the ice or frost on the evaporator coils.

Apparatus is also provided to detect the level of a narrow band of a liquid in a container utilizing an emitter of electromagnetic radiation which contains a wavelengths absorbable by the liquid, a reflector for reflecting the radiation and a detector sensitive to the preselected wavelength of radiation. As the liquid level rises above the level of the reflector, the liquid absorbs a portion of the electromagnetic radiation, and this decrease in intensity, which is proportional to the depth of the liquid, is detected by the detector and associated circuitry for initiating an appropriate alarm, control or indicator.

A change in state detector is also provided utilizing the present invention that includes apparatus similar to the ice or frost detector, with the narrow band of wavelengths of electromagnetic radiation selected to include the wavelengths absorbed by the substance either in its first state, such as water, or after it has changed to a second state, such as ice. The detector will then detect the change in received intensity of the electromagnetic radiation when the water freezes and becomes ice, since the ice will absorb a portion of the selected wavelengths of electromagnetic radiation which was not absorbed by the water in a liquid state.

Means are also provided for generating electromagnetic radiation having a wavelength absorbable by the ice or frost and disposed in the evaporator coil compartment for directing the electromagnetic radiation on the frost accumulated on the coils for absorption by the frost to melt the ice or frost without heating the surrounding medium.

A process and means is also provided for generating electromagnetic raidaiton in a narrow band containing wavelengths absorbable by water vapor in the humid air of a refrigeration unit for treating the air as it passes into a portion of the evaporator coil compartment to raise the energy level of the water vapor molecules to a level above the condensation point and thereby preventing condensation of the water vapor on at least a portion of the evaporator coils and thus preventing the accumulation of frost on the coils.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 11 is a perspective view of an ice or frost detecting apparatus disposed on an evaporator coil according to a third embodiment of the invention.

FIG. 12 is a detailed vertical cross-sectional view of the third embodiment of the invention taken along lines 12—12 of FIG. 11.

FIG. 13 is a perspective view of an ice or frost detecting apparatus for attachment to an evaporator coil according to a fourth embodiment of the invention.

FIG. 14 is a detailed vertical cross-sectional view of the fourth embodiment of the invention taken along lines 14—14 of FIG. 13.

FIG. 15 is a perspective view of a housing for a control circuit for use with the ice or frost detecting apparatus.

FIG. 18 is a vertical cross-sectional view of an apparatus for detecting the physical change in state of a substance according to the present invention.

FIG. 24 is a schematic representation of one embodiment of a control circuit for accomplishing frost detection, initiating and controlling a defrost cycle, and controlling the operation of the refrigerating cycle in a refrigeration unit.

FIG. 25 is a schematic representation of another embodiment of a control circuit for accomplishing frost detection, initiating and controlling a defrost cycle, and controlling the operation of the refrigerating cycle in a refrigeration unit.

DETAILED DESCRIPTION OF PREFERRED EMBODIMENTS

The present invention has numerous uses, although it is especially suited for detecting and controlling the buildup or accumulation of ice or frost in refrigerating equipment. Accordingly, the references made to refrigerating equipment and the detection of ice or frost in this specification are merely by way of examples and are not to be construed as limitations of the invention. It will be apparent that this invention has many applications in other fields, i.e., the fields of process control, particularly for the deposit or accumulation of ordered or unordered solid materials on a desired surface.

Figure 1:
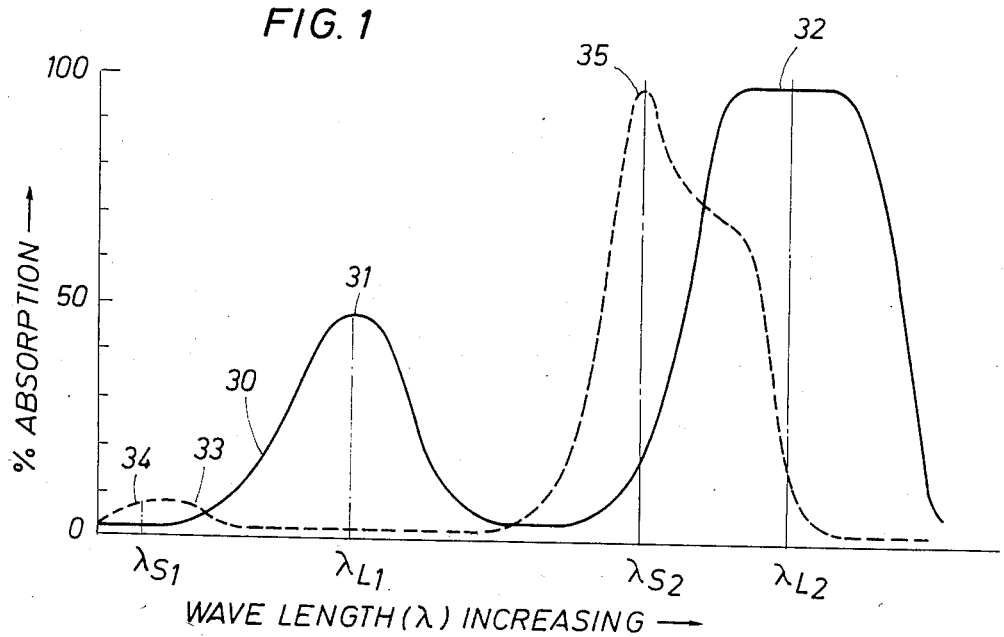
FIG. 1 is a graphical representation of the percentage absorption of electromagnetic radiation dependent upon wavelength for a substance in its liquid and solid states.

It is known that molecules of substances accept, transmit, absorb, and scatter certain preferred wavelengths of electromagnetic radiation. A molecule of a known substance will have a unique wavelength spectrum of absorption while a broad range of wavelengths will be scattered. In explaining the absorption phenomena, it may be considered that a wavelength of electromagnetic radiation absorbed by a material may effect an increase in the rotational energy of the molecule of the material while absorption at another wavelength of electromagnetic radiation may effect an increase in the vibrational energy of the material molecule. The absorption spectrum of a selected material or substance may be graphically represented as in FIG. 1. In FIG. 1, the solid curve 30 plots percent absorption against the wavelength of electromagnetic radiation to which a liquid substance is exposed. The first peak 31 occurs at wavelength $\lambda_{L1}$ and may be a rotational absorption band for the particular liquid, while $\lambda_{L2}$ might indicate a vibrational absorption band for the same liquid peaking at 32. It is also known that the absorption band changes when the physical state of the substance changes, i.e., from a liquid to a solid, or from a gas to a solid, etc. Accordingly, dotted curve 33 of FIG. 1 plots percent absorption against the wavelength of electromagnetic radiation to which a solid substance is exposed, the solid substance being a change in state of the same substance for which curve 30 was plotted. The first peak 34 at wavelength $\lambda_{S1}$ might indicate a rotational absorption band for the substance in a solid state, while peak 35 occurs at wavelength $\lambda_{S2}$ and may indicate a vibrational absorption band for the solid substance. Accordingly, it can be seen that a given substance has a discrete absorption band for certain electromagnetic radiation wavelengths, and the change of state of the substance, i.e., liquid to solid, solid to liquid, etc., will shift the discrete rotational and vibrational absorption bands of the molecules of the substance.

If electromagnetic radiation is incident upon a solid, gas, or liquid, the surviving beam intensity of the radiation due to absorption within the material can be calculated by use of Beer's Law in the following equation:

$$I = I_o e^{-kx}$$

where:
I = surviving intensity of the radiation
$I_o$ = original intensity of the radiation
x = distance radiation travels in the material
k = a function of the wavelength of radiation, i.e., k ($\lambda$).

Figure 2:
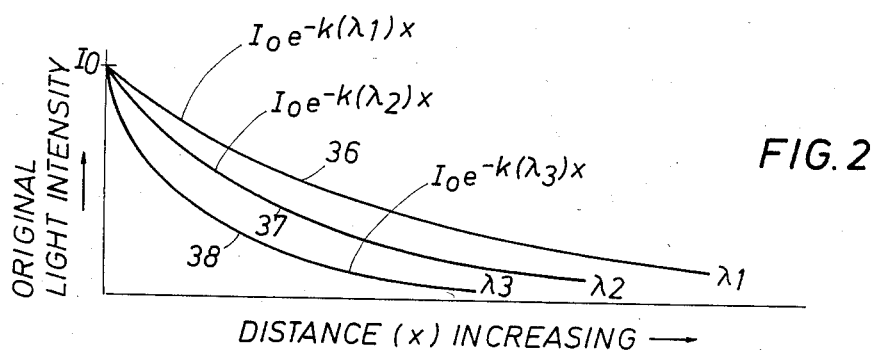
FIG. 2 is a graphical representation of a family of curves illustrating the absorption by a substance of electromagnetic radiation dependent upon wavelength with relation to increasing thickness of the substance.

Accordingly, we can represent the absorption of various wavelengths of electromagnetic radiation, such as, λ1, λ2 and λ3, by a family of curves 36, 37 and 38, as shown in FIG. 2.

The physical phenomena of scattering is based on the quantum theory of electromagnetic radiation, in which the electromagnetic radiation is composed of a stream of discrete particles. In scattering, the particles (photons) strike molecules of the material and the photon is reflected or deflected from its beam path. As the linear density of a material increases (directly related to the thickness of the material or number of molecules), the probability increases that the stream of photons will strike a molecule or molecules of the material and be reflected, i.e., scattered. As the thickness of the material increases, the probability increases for increased deflection of photons, and therefore the total number of photons transmitted through the material decreases, while the total number of photons reflected or scattered back out of the material increases.

The effect of scattering is not pronounced in a liquid, and the decrease in intensity of a beam of electromagnetic radiation traversing a distance X in a selected liquid is due mainly to absorption because of the random movement of the molecules of the liquid material. However, in an ordered or unordered solid, for example certain kinds of ice are ordered solids with a regular molecular crystalline structure, while frost is an unordered solid with an irregular or randomly spaced molecular crystalline structure, the effect of scattering becomes an important factor. The effect of scattering is not as wavelength dependent as that due to absorption, but it is a significant factor. Accordingly, there alway exists wavelength for detecting the decrease in intensity of electromagnetic radiation passing through such an ordered or unordered solid due to absorption. However, since it is not practical to generate electromagnetic radiation of a single wavelength, a narrow band of wavelengths is ideal.

There are certain advantages of detecting frost thickness by utilizing electromagnetic radiation of a narrow band of wavelengths. Increased sensitivity and accuracy of measurement are achieved by utilizing such narrow-band electromagnetic radiation as opposed to a broad-spectrum eletromagnetic radiation.

Blackbody radiation emitted from a standard tungsten lamp is emitted according to the Stefan-Boltzmann law:

$$W = \epsilon \sigma T^4$$

Where:
W = radiant energy in watts/cm$^2$
$\epsilon$ = emissivity factor of a particular material
$\sigma$ = a constant
T = temperature in kelvins The standard tunsten visible light source is very sensitive to fluctuations in ambient temperature because the total energy radiated is proportional to T$^4$. This means that fluctuating ambient temperature would result in a fluctuation in total radiated intensity proportional to the fourth power of the absolute temperature change. This problem is further complicated by a fluctuating voltaage onfhe source, since such a fluctuation would cause fluctuations in the temperature of the source, and produce a fluctuation in the total energy radiated as described above.

In addition, such fluctuations in temperature also produce shift in the wavelength spectrum of the source since the wavelengths at which the maximum amount of energy is emitted becomes shorter as the temperature is increased as provided by Wien's displacement law:

$$\lambda_{max} = 2.89 \times 10^3 \mu m/T$$

Where:
$\lambda_{max}$ = wavelength inmicrometers
T = temperature in kelvins

The relationship between spectral emissivity, temperature and radiant energy is given by Planck's equation:

$$W_\lambda = \frac{\epsilon_\lambda c_1}{\lambda^5(e^{c_2/\lambda T} - 1)}$$

Where:
$W_\lambda$ = radiation emitted by an object at a given wavelength
$\epsilon_\lambda$ = emissivity of the object at the same wavelength
$c_1$ = Planck's first radiation constant (3.75 × 10$^{-12}$W cm$^2$)
$c_2$ = Planck's second radiation constant (1.438 cmK)
$\lambda$ = wavelength in micrometers
T = temperature in kelvins The shift in energy distribution inthe emission of the broad band source results in different intensities at all wavelengths reaching the detector. If the total energy of a substantial portion of the electromagnetic spectrum is being collected and measured, a significant error will be made in the frost measurement. This is true because the transmission and scattering of the electromagnetic radiation is wavelength dependent. Likewise, of the total energy generated by the tungsten source, the energy transmitted throug hhe frost is wavelength dependent.

As can be seen above, the shift in temperature for a standard tungsten broad spectrum source causes critical shifts in the wavelength spectrum emitted and the radiant energy emitted by the source. The resulting effect is an increased scattering and transmission at some wavelengths and decreases at other wavelengths. If a narrow band is selected for measurement of the frost thickness this error can be reduced considerably.

The dependence of a radiation emitting PN junction semiconductor on temperature is substantially smaller than the corresponding effect on a Blackbody radiatior which is placed in a refrigerated area.

The effects of fluctuation of ambient light on broad band emission, detection and measurement are considerable and have much the same effect on measurement as voltage in temperature fluctuation. The ambient light effects can be minimized by using electromagnetic radiation in a narrow band of wavelengths for the thickness measurement. Since the total energy in the narrow band of the source can be made large relative to the ambient energy fluctuation in the narrow band, the effect of ambient flucuations can be minimized by using electromagnetic radiation of a narrow band of wavelengths for the measurement.

The same transmission and scattering effects above discussed with regard to temperature and wavelength changes come into play when changes in ambient radiation are experienced, and can also be minimized by selecting electromagnetic radiation of a narrow band of wavelengths in which to perform the measurement.

Similarly, the decrease in intensity of electromagnetic radiation due to scattering may be expressed in a complex equation similar to Beer's Law above expressed.

Under certain circumstances, the reflective scattering, i.e., the effects of scattering measured on the same side of the material as the emitter of the electromagnetic radiation, can be relied on to detect the thickness of the material. In this technique, the reflective scattering from the surface and interior of the material increases as the thickness of the material increases, as opposed to the phenomena above discussed where the electromagnetic radiation intensity decreases when measured on the opposite side of the material.

Thus, in the description that follows, electromagnetic radiation of a narrow band of wavelengths means a narrow bandwidth of electromagnetic radiation comparable to the electromagnetic radiation emitted by the action of electrons traversing the energy gap of semiconductor materials, as conventionally defined in semiconductor physics, a substantial portion of such "narrow band" containing wavelengths at which either or both the absorption and scattering effects are pronounced. An "absorption band of wavelengths" means a narrow band of radiation containing of the wavelengths at which maximum absorption effects are pronounced, such as in the transmission of the electromagnetic radiation in liquids.

Figure 3:
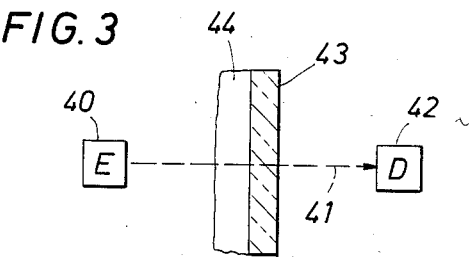
FIG. 3 is a diagrammatic representation, partly in cross-section, illustrating one technique for the detection of an ordered or unordered solid deposited on a transparent surface utilizing the absorption and scattering phenomena of electromagnetic radiation transmission.

Referring now to FIGS. 3 through 6, various physical arrangements are illustrated for detecting the thickness of a material in accordance with the absorption and scattering phenomena above discussed. FIG. 3 illustrates the detection of the thickness of an ordered or unordered solid 44 on a transparent surface 43, utilizing a source or emitter 40 of electromagnetic radiation of a narrow band of wavelengths transmitting radiation along path 41 to a detector 42. The emitter 40 transmits the band of radiation 41 having a narrow band of wavelengths and of a selected intensity that is detected by detector 42. As the thickness of the material 44 increases, the intensity of the band of electromagnetic radiation 41 decreases at detector 42 due to absorption or scattering or a combination of both phenomena, proportional to the thickness of material 44.

Figure 4:
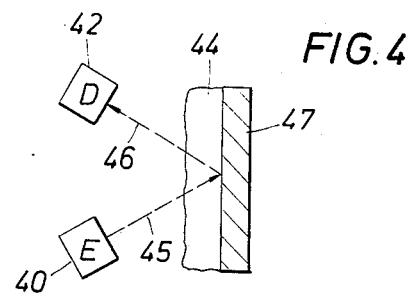
FIG. 4 is a diagrammatic representation, partly in cross-section, illustrating another technique for the detection of an ordered or unordered solid deposited on a reflective surface utilizing the absorption and scattering phenomena of electromagnetic radiation transmission.

In FIG. 4, the material comprising an ordered or unordered solid 44 is deposited on a material 47 having a reflective surface. Emitter 40 and detector 42 are positioned on the same side of the material 44 to be detected. Emitter 40 transmits a narrow band of electromagnetic energy having a narrow band of wavelengths and a selected intensity along path 45 through material 44 and reflects from the surface of material 47 along 44 path 46 to detector 42. As the thickness of material 44 increases, the intensity of the reflected electromagnetic radiation 46 decreases at detector 42 in a relation proportional to the increase in thickness of material 44 due to absorption or scattering or a combination of both phenomena.

Figure 5:
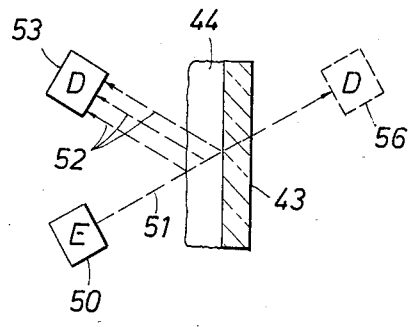
FIG. 5 is a diagrammatic representation, partly in cross-section, illustrating another technique for the detection of an ordered or unordered solid deposited on a transparent surface utilizing substantially solely the reflective scattering phenomena of electromagnetic radiation transmission or a combination of reflective scattering and absorption.

FIG. 5 depicts an ordered or unordered solid material 44, such as frost or ice, deposited on a transparent material 43. An emitter or source 50 of electromagnetic radiation of a narrow band of wavelengths directs a beam of electromagnetic radiation of and selected intensity along a path 51 which is transmitted through material 44 and transparent member 43. However, if detector 53 is located on the same side of material 44 as emitter 50, the detector 53 is selected to detect the reflected scattering of electromagnetic radiation along paths 52 as it is reflectively scattered from the surface and interior of material 44. Such reflection of electromagnetic radiation is in a relation proportional to the thickness of material 44, the reflective scattering of electromagnetic radiation increasing in proportion to the increase in thickness of the material 44. In addition, a second detector 56 can be located on the opposite side of transparent member 43 from emitter 50 for simultaneously detecting the decrease in intensity of the band of electromagnetic radiation travelling along path 51 through frost 44 and member 43.

Figure 6:
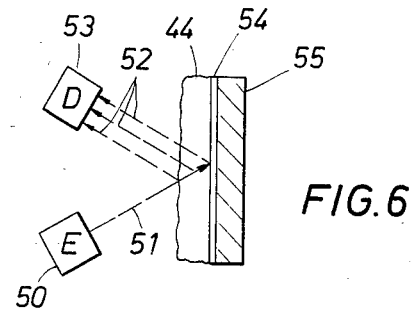
FIG. 6 is a diagrammatic representation, partly in cross-section, illustrating another technique for the detection of an ordered or unordered solid deposited on a surface having a material for absorbing electromagnetic radiation energy utilizing substantially solely the reflective scattering phenomena of electromagnetic radiation transmission.

FIG. 6 illustrates another reflective scattering technique utilizing an emitter 50 and detector 53 spaced on the same side of an ordered or unordered solid material 44 deposited on a member 55 having a coating for absorbing electromagnetic radiation emitted from source 50. Emitter 50 transmits a narrow band of electromagnetic radiation and selected intensity along path 51 through material 44 where it strikes absorptive coating 54 of member 55 and is absorbed. The coating 54 is selected to absorb the narrow band of wavelengths of the transmitted electromagnetic radiation. However, electromagnetic radiation is reflectively scattered from the surface and interior of material 44 along paths 52 to detector 53. As previously mentioned, the reflective scattering phenomena causes an increase in the reflected scattered radiation detected by detector 53 in a relation proportional to the increase in thickness of material 44. In both the processes illustrated in FIGS. 5 and 6, the radiation detected by detector 53 results substantially solely from scattering, and more precisely, reflective scattering.

Figure 7:
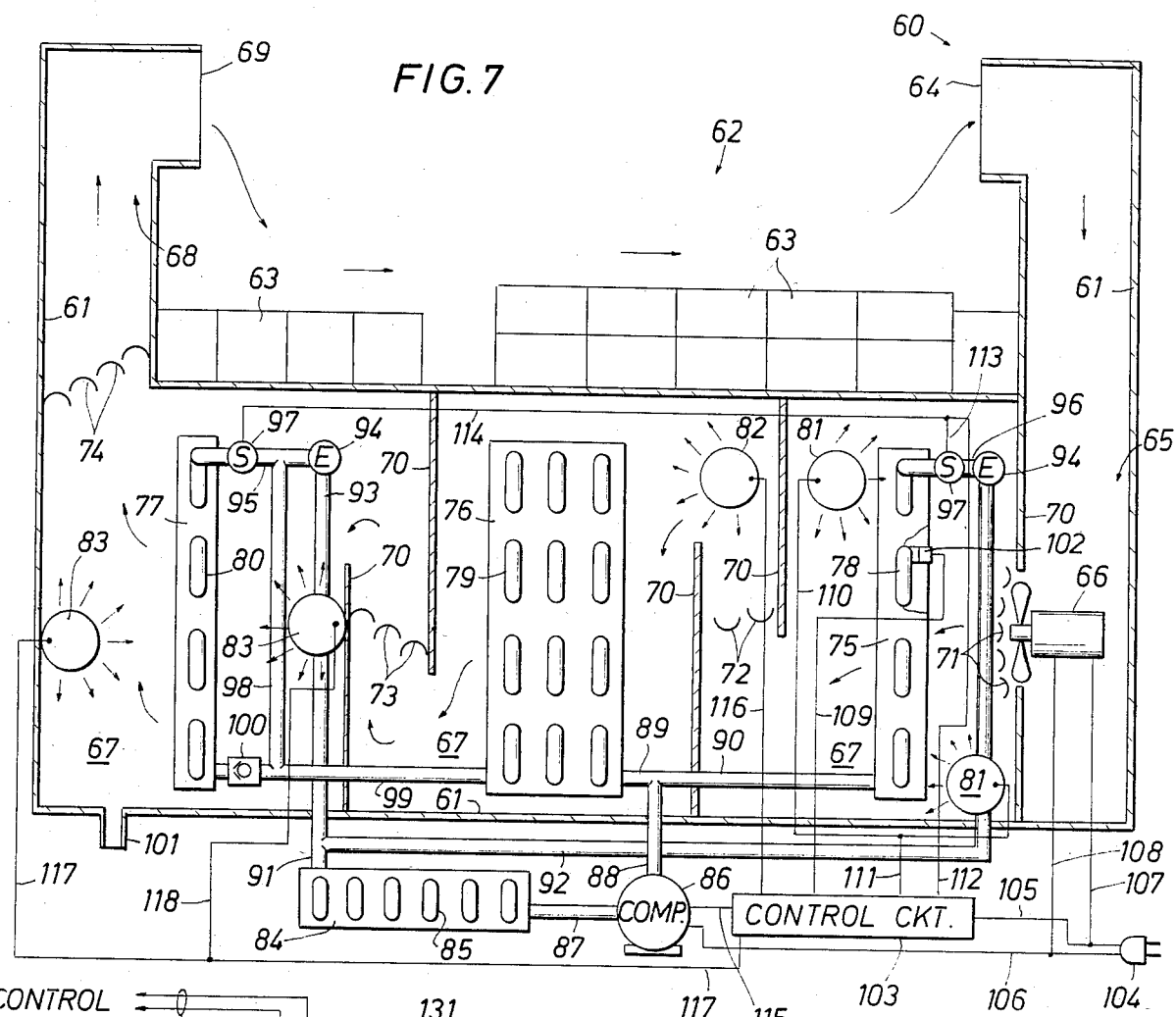
FIG. 7 is a side elevational view (partly in cross-section) of a refrigeration unit utilizing the present invention for controlling the accumulation of ice or frost on the evaporator coils of the refrigeration equipment.

Referring now to FIG. 7, refrigerating unit 60 for practicing the present invention is shown having a frame and case 61 and a refrigerated compartment 62 for holding and storing perishable goods 63. Air flow through the refrigerator moves through intake or inflow air duct 64 and through a duct 65 where it is moved by means of fan blower 66. The circulating air is moved through passageways defined by baffles 70, and reflectors 71, 72, 73 and 74, which will be hereinafter further described, through evaporator compartment 67 for passage through duct 68 where it is expelled through outflow air duct 69 and into the refrigerated goods compartment 62 for cooling and refrigerating the goods 63. The air moved by blower 66 travels around reflectors 71 and through a first evaporation coil unit 75, through the passages formed by baffles 70, around reflectors 72, through a second evaporation coil unit 76, between another series of baffles 70 and reflectors 73, and through a third evaporation coil unit 77, and then around additional reflectors 74 and into the return duct 69, as hereinabove described.

The first evaporator coil unit 75 comprises a series of evaporator tubes or coils 78 connected by means of tubing 89 and 90 to the second evaporator coil unit 76 and to a compressor 38 by means of tubing 88. The first evaporator coil is further connected by means of tubing 96 through a solenoid valve and an expansion valve 94 to tubing sections 91 and 92 to one side of a condenser coil unit 84 made up of coils or tubing 85. The second evaporation coil unit 76 comprises a series of evaporator tubes or coils 79 connected by means of tubing 88 and 89 to the compressor 86 as hereinabove previously described. The second coil is also connected by means of tubing section 99 through a check valve 100 to the tubing 80 of the third evaporator coil unit 77. Disposed between the opposite ends of evaporator coil 77 is a tee tubing 95 and solenoid and expansion valves 97 and 94, respectively. The other side of the expansion valve 94 is also connected by means of tubing sections 93 and 91 to the coils of condenser coil unit 84. The other end of condenser coil unit 84 is connected via tubing 87 to compressor 86, for circulation of the refrigerating fluid through the evaporator units 75, 76 and 77 and condenser unit 84 in a conventional manner.

The motor of blower 66 is connected via electrical conductors 105, 106, 107 and 108 to a source of electrical power by means of plug 104. Electrical power is furnished through plug 104 and conductor 105 as one input to a control circuit 103. The control circuit 103 controls the operation of electromagnetic radiation energy sources 81, 82 and 83, by means of conductors 110, 111, 116, 117 and 118, respectively, or controls other conventional defrost means (not shown) and the operation of compressor 86 via conductor 115, for purposes to be hereinafter more fully explained. Electrical power is also applied to the motor of the compressor 86 by means of an electrical conductor 106 and plug 104. An ice or frost detecting apparatus 102 is attached to one of the coils 78 of the first evaporator unit 75 for detecting the buildup of ice or frost on the coil 78 and signalling the control circuit 103. A drainpipe 101 is provided for draining off the water after the defrost of the evaporator coils 78, 79 and 80, or other condensate obtained in the refrigeration process.

In operation, the compressor 86 pumps refrigerating fluid through tubing 87 to the coils 85 of the condenser unit 84 and then to the first evaporator unit 75 by means of tubing 91 and 92, expansion valve 74 and tubing 95 and solenoid valve 97 to one end of coils 78 of unit 75. Refrigerating fluid passes also from condenser 84 through tubing 91 and 93, expansion valve 94, tubing 95 and solenoid valve 97 to coils 80 of evaporator unit 77. The refrigerating fluid flows from coils 80 through check valve 100 and tubing 99 to coils 79 of the second evaporator unit 76. The flow from evaporator units 75 and 76 flows through tubing sections 90, 89 and 88 to be returned to the compressor 86 to repeat the flow cycle. If solenoid valve 97 is closed, then flow of refrigerating fluid from expansion valve 94 is shunted through tubing sections 98 and 99 to the second evaporator coil section 76. With solenoid valve 97 closed, no refrigerating fluid flows through evaporator unit 77. If solenoid valve 97 of unit 75 is closed, then flow of refrigerating fluid from expansion valve 94 is blocked and no refrigerating fluid circulates in the first evaporator coil unit 75. The refrigerating fluid circulating through evaporator unit 76 is returned to compressor 86 via tubing sections 88 and 89, as hereinabove described.

As it passes over the surface of the coils 78, 79 and 80, of the evaporator coil units 75, 76 and 77, respectively, the refrigerating fluid absorbs the heat contained in the air moving through evaporator compartments 67, thereby cooling the circulating air. At a known temperature, the water vapor in the cooled air begins to condense on the surfaces of coils 78, 79 and 80, of the evaporator coil units 75, 76 and 77, respectively, and when further cooled to freezing temperature, begins to form ice or frost. As the frost builds up, it acts to insulate the air flowing through the evaporator coils and thereby inhibits the heat transfer process, with the result that temperatures in the refrigerating compartment 62 are not maintained at the desired levels.

At the present, the conventional technique for defrosting evaporator coils 75, 76 and 77 is to stop circulation of the refrigerating fluid and actuate heaters (not shown) for heating the surfaces of coils 78, 79 and 80 to melt the accumulated ice or frost. Once the defrost cycle is accomplished, the refrigeration cycle is resumed. The defrost cycle is commonly controlled by a defrost clock set to initiate the defrost cycle at preselected intervals of time without regard to the quantity of ice or frost accumulated on the evaporator coils 78, 79 and 80. With so much heat generated during the defrost cycle, it is even more difficult to maintain the desired temperatures in the refrigerator compartment, and the motor of compressor 86 must work longer and harder to stabilize the temperature.

By utilizing the apparatus shown in FIG. 1, the water vapor in the air circulated by fan blower 66 will tend to first condense on the first evaporator coil 75 where it is deposited in the form of frost. This condensation removes a substantial portion of the water vapor from the circulated air. The air, after passing over the surfaces of coils 78 of evaporator unit 75 moves by reflectors 72 and into the passageway created by baffles 70 which direct the air over and around a source of electromagnetic radiation 82 having a absorption band of wavelengths and a selected intensity. Some of the radiation electromagnetic of the absorption wavelengths of water vapor are absorbed by the water vapor. This absorption is sufficient to raise the energy levels of the water vapor molecules and inhibits the condensation of the water vapor and the subsequent buildup or accumulation of ice or frost on the surface of coils 79 of evaporator unit 76, since the water molecules are maintained at an energy level above condensation. After leaving evaporator compartment 67 and evaporator unit 76, the air, with some of its water vapor molecules raised to an energy state above condensation, passes around reflectors 73 and between baffles 70 to be directed over the surfaces of coils 80 of evaporator unit 77. The third evaporator coil unit 77 is provided to remove additional water vapor from the discharge air leaving the second evaporator coil unit 76. Such removal of additional water vapor is desirable, since the less humid the air discharged through outflow duct 69 into compartment 62, the less frost will accumulate on the refrigerated product 63. Of course, as some of the water vapor condenses on the surfaces of coils 80 of evaporator unit 77, frost forms on the coil surfaces and the insulation of the coil surface and the circulating air takes place as hereinbefore previously described. However, since the water vapor does not condense on the surfaces of coils 79 of the second evaporation unit 76, uninterrupted refrigeration of the product compartment 62 may be effected.

Reflectors 72 and 73 are provided to retain electromagnetic radiation from source 82 in the compartment of the evaporator unit 76. Similarly, the interior of the evaporator compartment 67 surrounding evaporator coil unit 76 may be coated with a reflective material for reflecting a maximum amount of electromagnetic radiation into and around the compartment for contact with the circulating air.

A detector 102 for detecting the accumulation of ice or frost is shown disposed on a coil pass 78. Detector 102 is interconnected to control circuit 103 by means of an electrical cable 109, and its operation will hereinafter be more fully explained. The detector signals control circuit 103 when a preselected thickness of ice or frost has accumulated on coil 78, and the control circuit 103 in turn activates a pair of sources 81 of electromagnetic radiation of an absorption band of wavelengths and selected intensity, the wavelengths selected being ones that are readily absorbed by ice or frost and not absorbed by the structure 61 or coils 78. The radiation from sources 81 will be absorbed by the ice and/or frost only, raising the temperature of the ice or frost and causing it to melt and to flow through drain 101 as water. However, the other constituent molecules of the air do not absorb an appreciable amount of the wavelength of radiation and hence are not heated by the radiation. Similarly sources of electromagnetic radiation 83, having an absorption band of wavelength and selected intensity, are positioned to direct the radiation on the frost accumulated on the third evaporator coil unit 77. Here again, the wavelength of the radiation selected is one that is readily absorbed by ice or frost and is not absorbed by the case structure 61 or the coils 80. Accordingly, the frost on coil surfaces 80 will be heated and melted, but the surrounding medium will not be heated. The radiation sources 83 can be energized simultaneously with energization of radiation sources 81, thereby effecting defrosting of the first and third evaporator coil units 75 and 77, respectively. To speed up the defrost cycle of evaporator units 75 and 77, the solenoid valves 97 of each unit may be closed by an appropriate signal from control circuit 103, thus shutting off the flow of refrigerating fluid in units 75 and 77. However, as previously described, refrigerating fluid will continue to flow through the second evaporator coil unit 76, and since no condensation of water vapor occurs on the surfaces of coils 79, the refrigeration of the circulating air continues uninterrupted. Reflectors 71 and 74 are utilized to retain the radiation from sources 81 and 83 in the evaporator compartments surrounding evaporator units 75 and 77. In addition, the inside of the compartment 67 may be coated with a reflective material to enhance reflection and maximum distribution of the radiation in the compartment. Of course, the ice or frost detector 102 and control circuit 103 may be utilized to control conventional defrost heaters and refrigerating circulating equipment in a conventional manner. It is apparent that a conventional refrigeration system utilizing electric defrost heaters could have these heaters replaced with electromagnetic radiation sources such as 81, 82 and 83. The radiation sources must contain wavelengths of radiation which are absorbed by the ice or frost. Such sources might be a quartz infrared lamp, a laser or a gas discharge tube which contains a gas which has an emission band which is coincident in part with an absorption band of the ice or frost.

In addition, the surface of compartment 67 and the surfaces of tubings 78, 79 and 80 may be coated with a material for absorbing a broad spectrum of wavelengths of electromagnetic radiation. The wavelength of radiation of sources 81, 82 and 83 may be chosen to be included within the absorption spectrum of the coating for causing the coating to absorb the radiation and heat the coating. When the coating on the coils heats, the ice or frost will be heated and subsequently melted. The heating of the coating of the compartment will insure that any ice or frost formed on the walls of the compartment are heated and melted. In the circumstances just described, the wavelengths of the electromagnetic radiation chosen for sources 81, 82 and 83 would not necessarily be one of the wavelengths of absorption of the ice or frost.

Figure 8:
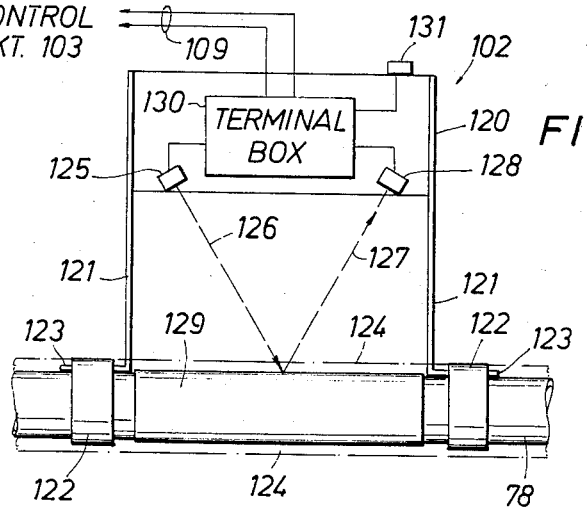
FIG. 8 is a side elevational view (partly in cross-section) of an ice or frost detecting apparatus disposed on an evaporator coil according to one embodiment of the invention.

Referring now to FIG. 8, a side elevational view, partly in cross-section, of the ice or frost-detecting apparatus 102 is shown in detail. Detector 102 comprises a support housing 120 carrying a source of electromagnetic radiation or emitter 125 that transmits a narrow band, along path 126, of electromagnetic radiation of a selected intensity, that is absorbed or scattered by ice or frost. The support housing 120 also carries a photodetector 128 that is selected to receive and detect the wavelengths of electromagnetic radiation emitted by source 125 and reflected from coil 78 by path 127. Under certain conditions, an ambient condition light detector 131 may also be utilized as a reference source of electromagnetic radiation to detect ambient light conditions in the area of the detector 102. Emitter 125, and photodetectors 128 and 131, are connected to a terminal box 130 which in turn is connected by electrical conductors of cable 109 to a control circuit 103 (as described in FIG. 7). Other embodiments of appropriate control circuits will be hereinafter further described.

Support housing 120 is spaced from evaporator coil 78 by means of extensions or legs 121 having flanged ends or feet 123 that may be attached to coil 78 by any conventional attaching means, such as bands or rings 122.

Coil 78 accumulates a layer or thickness of ice and frost 124 during the refrigeration cycle of the refrigerating apparatus. Emitter 125 is positioned to direct electromagnetic radiation of a narrow band of wavelengths and selected intensity through the layer of ice or frost 124 along a path 126 where the electromagnetic radiation is absorbed or scattered by the ice or frost. Referring also now to FIGS. 4 and 6, frost-detecting apparatus 102 may be utilized to detect a decrease in reflected radiation due to absorption with an increase in thickness of the frost, or an increase in reflected scattering of the radiation with an increase in thickness of the frost.

Referring to FIGS. 4 and 8, if the effects due to absorption are to be measured, the electromagnetic radiation 126 from emitter 125 will be directed through frost 124 where it will be reflected back from coating 129 of tubing 78 along path 127 to a detector 128, for detecting the decrease in the selected beam intensity as it passes through the frost 124 due to absorption in the manner earlier described with relation to FIG. 4. Similarly, referring now to FIGS. 6 and 8, the coating 129 of tubing 78 could be a coating of an absorptive material for absorbing the electromagnetic radiation passing through frost 124, and the electromagnetic radiation reaching detector 128 generally along path 127 will be due to reflective scattering from frost 124 in the manner earlier described in connection with FIG. 6. Detector 128 would detect an increase in reflective scattering as a result of the increase in thickness of the frost 124.

Ice or frost absorbs electromagnetic radiation in the infrared spectrum, and it has been found that the following wavelengths appear to be preferable for accomplishing the detection of the absorption and scattering phenomena in ice or frost: 0.94 microns, 1.5 microns, 2.87 microns or 6.3 microns. Of course, other absorption wavelengths in ice or frost may be utilized. In other materials, the preferred wavelengths would be those found to be the absorption and scattering wavelengths for the particular material. The narrow band of wavelengths to accomplish detection of electromagnetic radiation due to reflective scattering cover a broader range of wavelengths than those available for absorption. Some of the wavelengths for absorption are also excellent wavelengths to accomplish scattering.

Accordingly, it can be seen from FIG. 8 that a detector apparatus 102 may be provided for detecting the buildup of ice or frost on an evaporator coil 78 of a refrigeration unit, basically comprising an emitter or source 125 of electromagnetic radiation having a narrow band of wavelength and a selected intensity for directing electromagnetic radiation through the accumulated layer of frost 124 on the surface of coil 78, the ice or frost layer 124 absorbing or scattering some of the energy of the electromagnetic radiation in a relation proportional to its thickness. A detector 128, spaced from the emitter 125, is provided for receiving the electromagnetic radiation transmitted through the ice or frost 124 for detecting the changes in the intensity of the electromagnetic radiation in response to changes in the thickness of the layer of ice or frost 124. The emitter 125 and detector 128 are carried by the support housing 120 as hereinabove described, and the legs 121 and feet 123 form a bracket means for mounting the support housing 120 on the coil 78.

Figure 9:
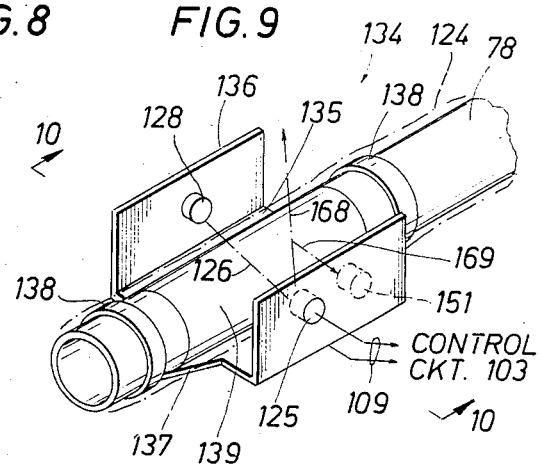
FIG. 9 is a perspective view of an ice or frost detecting apparatus disposed on an evaporator coil according to a second embodiment of the invention.
Figure 10:
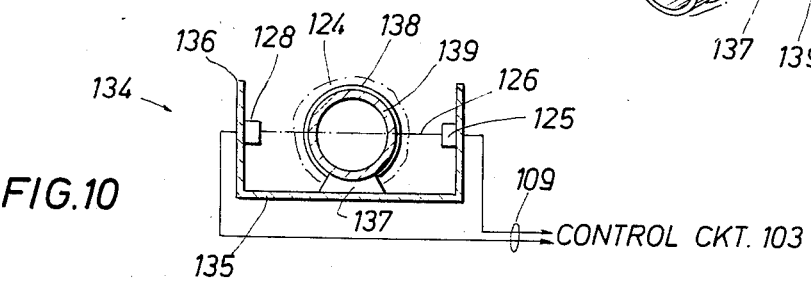
FIG. 10 is a detailed vertical cross-sectional view of the second embodiment of the invention as taken along lines 10—10 of FIG. 9.

Referring now to FIGS. 9 and 10, a second embodiment 134 of the frost detector according to the present invention is shown. In this embodiment, evaporator coil 78 contains a "sight glass" section 139 constructed of a material that is transparent and permits the free transmission, without absorption or scattering, of the electromagnetic radiation utilized to detect the frost. A source of electromagnetic radiation or emitter 125 is mounted for directing radiation having a narrow band of wavelengths and selected intensity through the built-up layer of frost 124 and the transparent section 139 along a path 126 to a detector 128, spaced from the emitter 125. Detector 128 receives the electromagnetic radiation and detects the changes in the intensity of the radiation in response to changes in the thickness of the ice or frost 124 covering the transparent section 139 in accordance with the absorption and scattering phenomena as earlier described particularly in connection with FIG. 3. Emitter 125 and detector 128 are mounted in a spaced-apart relationship on the upright flanges 136 of a bracket 135. The mounting bracket 135 is adapted for mounting to evaporator coil 78 by means of suitable mounting flanges 137 which may be secured to coil 78 by any conventional attaching means, such as a ring or band 138. Electrical conductors of cable 109 connect emitter 125 and detector 128 to a control circuit 103 (as described in FIG. 7). Other embodiments of appropriate control circuits will be hereinafter further described.

As previously described for FIG. 8, the apparatus 134 may also be modified to detect the changes in the reflected scattering of the electromagnetic radiation due to changes in the thickness of the frost 124 on the surface of sight glass section 139. In this event, a "scattering" detector 151 would be located on the same side of the sight glass section 139 and spaced therefrom for mounting on the upright flanges 136 of bracket 135. The electromagnetic radiation from emitter 125 would be directed through sight glass section 139 and the covering of frost 124 along beam path 168. In accordance with the scattering theory earlier discussed, particularly in connection with FIG. 5, the reflected scattered radiation is generally directed along path 169 and received by detector 151. As earlier described in connection with FIGS. 5 and 8, the detector 151 will detect an increase in electromagnetic radiation proportional to an increase in the thickness of the frost 124 deposited on sight glass 139. Further, the frost detector 134 may be utilized to detect a combination of scattering and absorption effects by utilizing both detectors 128 and 151 at the same time in accordance with the hereinabove described technique in connection with FIG. 5. The detected outputs of detectors 128 and 151 could then be applied to a bridge circuit which would be unbalanced when a predetermined thickness of ice or frost is detected for providing an extremely sensitive detector.

Referring now to FIGS. 11 and 12, yet a third embodiment 140 of the ice and frost detector, according to the present invention, is shown in detail. A source, or emitter 125 of electromagnetic radiation having a narrow band of wavelengths and a selected intensity is shown in a spaced-apart relationship from a detector 128 mounted on extending flanges 142 of a support member 141. Support member, 141 is attached to an extending leg 149 of a frost forming member 144. The other leg 148 of frost forming member 144 is adapted for attachment to coil 78 and is attached thereto by any conventional fastening means, such as a ring or band 145. In FIGS. 11 and 12, frost forming member 144 comprises a metal strip 143 bent into a U-configuration and then shaped into a generally L-shaped member having two legs 146 and a transversely extending portion having a curved end 147. The transversely extending portion of the metal strip forming curved end 147 is encased or embedded in a plastic or epoxy resin material or glass material that is transparent to the electromagnetic radiation having a narrow band of wavelengths but which will have heat transfer properties cooperating with metal frost forming strip 143 for providing a surface for accumulation of frost proportional to the accumulation on tubing 78. However, both the legs 146 and the extending U-shaped portion 147 may be encased in such a plastic material as shown in FIGS. 11 and 12 as long as one surface of metal strips or legs 146 can intimately contact the surface of coil 78 to establish sufficient heat transfer between coil 78 and metal strip 143 for causing frost 124 to accumulate on the surface of the frost forming member 144 in proportion to the accumulation or buildup of the frost 124 on the surface of coil 78.

Accordingly, with bracket 141 attached to the projecting leg 149 of the frost forming member 144, the emitter 125 is positioned for transmitting the electromagnetic radiation having a narrow band of wavelengths and selected intensity along path 126 through the layer of frost 124 and the transparent material 150 of the extending leg 149 of member 144. A detector 128 is positioned in an opposed spaced-apart relationship for detecting the changes in the intensity of the electromagnetic radiation in response to changes in the thickness of the frost 124 on the surface of member 144 in accordance with the absorption/scattering phenomena above described to obtain maximum sensitivity. Electrical conductors of cable 109 interconnect emitter 125 and detector 128 with a control circuit 103 (as described in FIG. 7). Other control circuitry, which will be hereinafter further described, can be utilized with the frost detector just described.

The drawings of FIGS. 11 and 12 show the frost forming member 144 as a generally L-shaped member, but the exact shape of member 144 is not critical as long as a surface for accumulation of frost is provided with sufficient heat transfer properties to insure a deposit of frost proportional to the accumulation of frost on the coil tubing, and provides the capability of carrying the emitter 125 and detector 128 for performing the frost detection either by the absorption or scattering technique. It is not necessary that the leg 149 of the frost forming member 144 be oriented at a right angle to leg 148, but oriented at such an angle transverse to leg 148 to accommodate bracket 141 to carry emitter 125 and detector 128 in proper spaced relationship to accomplish the frost detection by absorption or reflective scattering. Of course, as hereinabove described with regard to FIGS. 5 and 9, a "scattering" detector 151 could be spaced adjacent emitter 125 and used to detect electromagnetic radiation reflectively scattered from ice or frost 124 on the surface of member 144.

Referring now to FIGS. 13 and 14, a preferred embodiment 152 of the ice or frost detector is shown in detail. Detector 152 comprises a source or emitter 153 of electromagnetic radiation having a narrow band of wavelengths and a selected intensity for transmitting radiation along a path 155 to be intercepted and received by a detector 154 spaced from the emitter 153 for receiving the electromagnetic radiation. The emitter 153 and detector 155 are mounted in a spaced-apart relationship and carried by a one-piece integral plastic, epoxy, or glass body member 156 that is in turn fixed to an extending leg 160 of a frost forming member 157. Member 157 has another leg 158 adapted for mounting on the curved surface of evaporator coil 78. Member 157 is constructed of a material, preferably a metal, having a good selected heat transfer characteristic for establishing heat transfer between evaporator coil 78 and its radially extending leg 160. Leg 160 of member 157 has an aperture 167 therein and spaced from leg 158 for providing an opening through which the electromagnetic radiation may be directed from the emitter 153 to the detector 154 along path 155. Leg 158 of member 157 may be curved to fit the surface of coil 78 for establishing intimate contact with the surface of the coil for providing heat transfer between coil 78 and member 157 as hereinabove discussed with reference to the frost forming member 144 discussed in reference to FIGS. 11 and 12. Leg 158 of frost forming member 157 may be attached to the surface of coil 78 by any conventional attaching or fastening means such as a ring or band 159.

The body member 156 is generally U-shaped, having an opening 162 therein and carrying the emitter 153 and detector 154 in an opposed, spaced-apart relationship, as shown, in opposite portions of the U-shaped member. The aperture 167 in leg 160 of member 157 is preferably filled with a transparent material forming a transparent section or lens 161 for freely transmitting the beam of electromagnetic radiation from emitter 153 without absorbing any of the radiation in the narrow band of wavelengths. Accordingly, heat transfer will be established between the coil 78 and the extending leg 160 of member 157 for causing a layer of ice or frost 124 to accumulate on the surface of member 157 and the transparent section 161 proportional to the accumulation or buildup of the frost layer, 124 on the surface of coil 78.

Frost forming member 157 may be constructed of any suitable material having a good heat transfer characteristic, and aluminum and copper have been found to be ideally suited for this purpose. The shape may generally be an L-shape as shown in FIGS. 13 and 14 or any convenient configuration for allowing passage of the radiation beam through aperture 167 and transparent section 161 for detection by the absorption or scattering techniques as hereinabove disclosed in FIGS. 3 and 5. The body section 156 may be constructed of any type of a plastic, epoxy resin, or glass material, transparent or opaque, for purposes of carrying and supporting the emitter 153 and detector 154 in an opposed, spaced-apart relationship. In addition, embedding or "potting" of the emitter 153 and detector 154 seals the components, provides insulation, and waterproofs the components and their related wiring. The body support member 156 may be attached to the extending leg 160 of member 157 by any suitable attaching means, including the use of an epoxy glue or other suitable adhesive. Conductors 165 and 166 connect emitter 153 and detector 154, respectively, to a plug 163 for connection to a control circuit 170, to be hereinafter further described. Conductors 165 and 166 may, of course, be cast or embedded in the body section 156 along with any other components. A cable insulating sheath 164 protects conductors 165 and 166 and connects the plug 163 to the body member 156.

As ice or frost 124 builds up on the surface of coil 78 and the surfaces of the legs 158 and 160 of L-shaped member 157, the frost layer 124 will absorb or scatter some of the electromagnetic radiation directed by emitter 153 along path 155 to detector 154. The detector 154 receives the electromagnetic radiation and detects the changes in the intensity of the radiation in response to changes in the thickness of the frost 124 covering transparent section 161 due to absorption or scattering as hereinabove described. The transparent section 161 may preferably be constructed utilizing conventional techniques to provide a converging lens for converging the electromagnetic radiation from emitter 153 into a more concentrated and narrower beam of electromagnetic radiation directed along path 155.

The control circuitry for the frost detector 152 (or previously described embodiments 102, 134 and 140) may conveniently be packaged in a module as illustrated in FIG. 15. The circuitry may be housed in a unit 172 having a case or cover 173 and a front panel 174 connected to a chassis (not shown) carrying the circuit components. The cover 173 can be secured to the chassis by means of conventional fasteners such as screws 175. Air vents 176 provide a means of dissipating the heat created by the circuitry within housing 173. On the front panel 174, a control 177 is provided for setting the threshold level of the detector, as will hereinafter be further described. In practice, the female connector 179 accepts the plug 163 and connects the control circuit 170 with the remotely located frost detector. In addition, an indicator lamp 178 may be provided for indicating when the defrost cycle is in progress.

Figure 20:
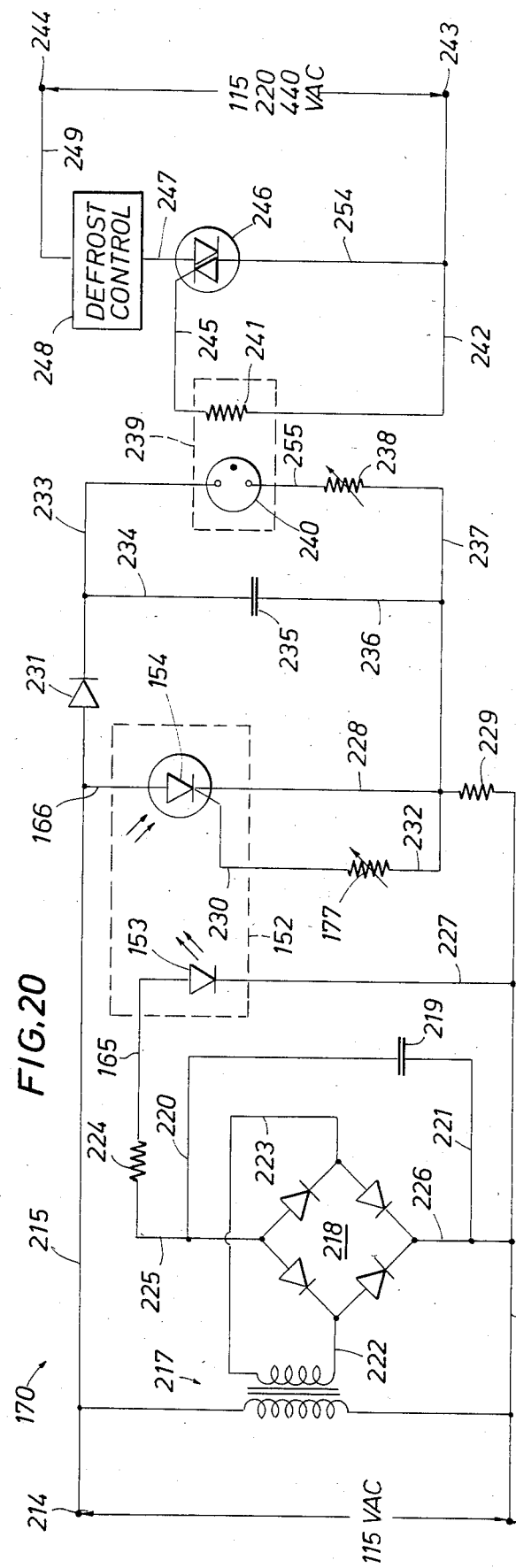
FIG. 20 is a schematic representation of one embodiment of a circuit for accomplishing frost detection and initiating a defrost cycle in a refrigeration unit.

Turning now to FIG. 20, a detailed schematic of the control circuit 170 is shown. Supply voltage of 115 VAC is applied across input terminals 213 and 214 to the primary coil of a transformer 217. Stepped down voltage is applied via the secondary coil of transformer 217 as an input to a full-wave rectifier 218 by conductors 222 and 223. One side of the output of the rectifier 218 is connected to the input terminal 213 through conductors 216 and 226. The other side of the output of the rectifier 218 is connected through conductors 165 and 225, and resistor 224 to the anode of a narrow band emitter such as a PN junction electromagnetic radiation emitting semiconductor such as an LED 153. The negative side of the LED 153 is connected to input terminal 213 through conductors 227 and 216. A storage capacitor 219 is connected across the output of rectifier 218 by conductors 220 and 221.

A photodetector device 154, which may conveniently be a light-admitting silicon controlled rectifier (LSCR), is connected across terminals 213 and 214 by means of conductors 166 and 228, resistor 229, and conductor 216. The gate lead of LSCR 154 is connected through conductors 230 and 232 and resistors 177 and 229 to the conductor 216 and terminal 213. Input voltage is also applied through conductor 215 to the anode of a diode 231. The cathode of diode 231 is connected to one terminal of a neon lamp 240 by means of conductor 233. Neon lamp 240 is an element of photocoupler 239, which also includes a photocell represented by resistor 241. The other terminal of the neon lamp 240 is connected by conductors 255 and 237 and resistors 238 and 229 to the conductor 216. In addition, a capacitor 235 is shunted around neon lamp 240 by conductors 234 and 236. One side of the photocell resistance element 241 of photocoupler 239 is connected by conductor 242 to one of the output load voltage terminals 243. The other side of photocell resistance element 241 is connected through conductor 245 to the gate lead of a TRIAC 246. TRIAC 246 is connected by conductors 242, 254 and 247 between terminal 243 and defrost control means 248. The defrost control means 248 is connected to terminal 244 by conductor 249.

Referring now to FIGS. 7, 13, 14, 15 and 20, the operation of the frost detector 152 and control circuit 170 for controlling the defrost of conventional refrigeration equipment will be explained. As hereinabove described, frost detector 152 is attached to coil 78, and as the ice or frost 124 builds up on the surface of coil 78, the intensity of the electromagnetic radiation having narrow band of wavelengths transmitted by emitter 153 will decrease at the detector 154 as the thickness of the frost layer 124 increases due to absorption and/or scattering. The threshold gate voltage of the detector (LSCR) 154 can be set to a desired value by variable resistor 273, coupled to the control knob 177 shown in FIG. 15. As the intensity of the electromagnetic radiation passing through transparent section or lens 161 decreases below a predetermined value, the LSCR 154 is gated off and ceases conduction. When LSCR 154 ceases to conduct, a voltage appears across neon lamp 240 of photocoupler 239 and charges capacitor 235. When 60 VAC (the voltage output of rectifier 218) appears across the terminals of the neon lamp 240, it conducts and radiates light to photocell resistance element 241. In accordance with conventional photocell technology, the impedance of the photocell resistance 241 is reduced to a low value, thereby closing the circuit between terminal 243 and the gate lead of TRIAC 246 through conductors 242 and 245, and the photocell resistor 241. The TRIAC 246 conducts and closes the load power circuit to the defrost control mechanism 248. With a voltage appearing across the defrost control 248, conventional defrost mechanisms, such as defrost heaters and the like, are energized and begin the defrost cycle to defrost the ice or frost 124 from evaporator coils 78.

Capacitor 235 functions to store an electrical charge in order to maintain the necessary voltage and conducting current to neon light 240 during the half-cycle in which there is no conduction through diode 231. A time delay for operating lamp 240 can be effected by making the RC time constant of capacitor 235 and resistor 238 large and may be adjusted by variable resistor 238. Thus, even after the ice or frost has been melted and the defrost cycle has physically been accomplished, an additional "defrost time" can be added to the defrost cycle. The defrost cycle will be terminated when the LSCR 154 resumes conduction after the defrost cycle is complete, including any time delay created by the RC network of capacitor 235 and variable resistance 238.

When LSCR 154 begins to conduct after the defrost cycle, neon lamp 240 of photocoupler 239 ceases conduction and photocell resistor 241 returns to a high impedance value, thus leaving the only effective resistance in the LSCR circuit as resistor 177, which determines the threshold gate level of LSCR 154 at which the defrost cycle will be initiated, as hereinabove described. In addition, when LSCR 154 begins to conduct and neon lamp 240 ceases conduction, TRIAC 246 is gated off, thus switching off the defrost control 248.

The above description of the operation of the ice and frost detector 152 and its associated control circuit 170 has been described with relation to operating conventional defrost control means 248. Such defrost control means may be thermal heaters, defrost clocks or other conventional apparatus. However, referring to FIG. 7, the defrost control 248 may activate a source or sources of electromagnetic radiation having an absorption wavelength that is only absorbed by ice or frost, such as radiation sources 81 and 83 hereinabove described. Since the frost will absorb the wavelengths of electromagnetic radiation, the frost will be melted without heating the surrounding medium.

Figure 21:
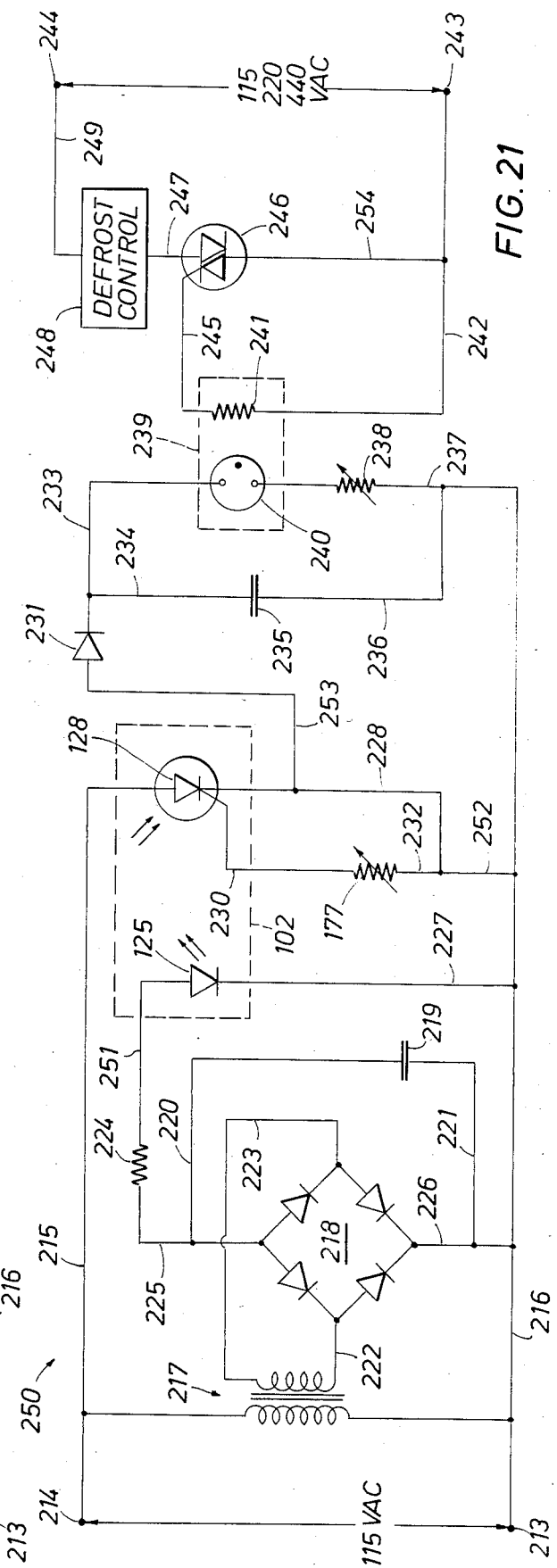
FIG. 21 is a schematic representation of another embodiment of a circuit for accomplishing frost detection and initiating a defrost cycle in a refrigeration unit.

Of course, while the control circuit 170 has been described above in connection with the frost detecting apparatus 152, any of the previous embodiments 102, 134 or 140 may be utilized with circuitry 170, provided the detector utilizes the absorption or scattering technique described above in connection with FIGS. 3 and 4. If the technique to be utilized involves the reflective scattering techniques above described in connection with FIGS. 5, 6, 8, 9 and 10, then a slightly different circuit 250 (see FIG. 21) must be utilized. In FIG. 21, control circuit 250 comprises nearly the identical elements and circuit components of control circuit 170. Accordingly, in FIG. 21 the elements that are identical to those in FIG. 20 are given the same reference numbers and the changed elements have new reference numbers.

Referring now to FIGS. 8, 9, 10, 11, 12, 20 and 21, control circuit 250 comprises an input power circuit to emitter (LED) 125 identical to that in FIG. 20. The anode of the detector (LSCR) 128 is connected directly to conductor 215 and input terminal 214. Resistor 229 is eliminated and conductor 216 is connected to the junction of conductors 237, 236 and 252. The anode of diode 231 is connected to the output lead 238 of LSCR by means of conductor 253. All other elements of the circuit are identical to that described above in connection with FIG. 20.

As hereinabove described, the frost detector 102, 134, 140 or 152, utilizing the reflective scattering technique previously discussed in connection with FIGS. 5 and 6, will detect an increase in thickness of frost 124 by an increase in the intensity of radiation reflectively scattered and detected by detector 128. The threshold gate voltage of the detector (LSCR) 128 can be set to turn on the LSCR at a desired bias value by adjusting the gate bias potentiometer 177. As the intensity of the electromagnetic radiation reflectively scattered from frost 124 increases above a predetermined value, the LSCR 128 is gated on and starts to conduct. When LSCR 128 conducts, voltage is applied to diode 231 which also conducts and applies voltage across the terminals of the neon lamp 240 of photocoupler 239 as hereinbefore described in connection with FIG. 20, thus activating TRIAC 246 and activating defrost control means 248 as previously described. When the frost is melted by the defrost means 248, no electromagnetic radiation will be reflectively scattered and detected by detector 128, thus causing LSCR 128 to cease conduction, in turn causing diode 231 to cease conduction and turning off the neon lamp 240 of photocoupler 239. When lamp 240 is extinguished, the photocell resistance 241 goes to a high impedance value, gating off TRIAC 246 and switching off the defrost control 248, as hereinabove described.

In the above described control circuits 170 and 250, it is readily seen that the photodetector (LSCR) 154 or 128, respectively, operate in conjunction with an electrical control circuit comprising a defrost power switch means comprising TRIAC 246 and a defrost coupling switch means 239 interconnected to the defrost power switch means above defined and operable in response to the control signal generated by the LSCR 154 or 128, i.e., when the LSCR 154 ceases to conduct or when LSCR 128 starts conduction. The RC network comprising capacitor 235 and resistor 238 further acts as a time delay circuit for holding the defrost coupling switch means 239 closed for a preselected time period after completion of the defrost cycle.

Referring now to FIGS. 13, 14 and 24, a detailed schematic of another embodiment 320 of the control circuit is shown. Supply voltage of 115 VAC is applied across input terminals 321 and 322 to the primary coil of a transformer 325. Stepped down voltage is applied via the secondary coil of transformer 325 as an input to a full-wave rectifier 326 by conductors 327 and 329. One side of the output of the rectifier 326 is connected to the input terminal 322 through conductors 328 and 324. The other side of the output of rectifier 326 is connected through conductors 165 and 330, and resistor 334 to the anode of a light-emitting diode (LED) 153. The negative side of the LED 153 is connected to input terminal 322 through conductors 336 and 324. A storage capacitor 331 is connected across the output of rectifier 326 by conductors 332 and 333.

A photodetector device 154, which may conveniently be a light-admitting silicon controlled rectifier (LSCR), is connected across terminals 321 and 322 by means of conductors 166, 323 and 361, resistor 363, and conductor 324. Input voltage is also applied through conductors 323 and 338 to the anode of a diode 339. The cathode of diode 339 is connected to one terminal of a neon lamp 350 by means of conductor 340. Neon lamp 350 is an element of photocoupler 348, which also includes a photocell represented by resistor 352. The other terminal of the neon lamp 350 is connected by conductors 346, 341 and 324 and resistor 345 to the input terminal 322. In addition, a capacitor 342 is shunted around neon lamp 350 by conductors 343 and 344. One side of the photocell resistance element 352 of photocoupler 348 is connected by conductor 353 to the conductor 361 side of resistor 363. The other side of photocell resistance element 352 is connected through conductors 354, 356 and 358, and variable resistor 355 to the gate input of the LSCR 154. A gate biasing resistor 359 is connected between resistor 355 and fuse 357 by conductor 360 and to conductor 353 by conductor 362. A thermostat or thermal switch element 357 is connected between the gate lead 358 and lead 356 of LSCR 154.

The anode lead of LSCR 154 is also connected via conductors 166 and 323 to the anode of diode 364. The cathode of diode 364 is connected through conductor 365 to one terminal of a neon lamp element 370 of a second photocoupler 369. The other terminal of neon lamp 370 is connected through conductors 371 and 353, and variable resistor 372, to the conductor 361 side of resistor 363. A capacitor 367 is shunted across the series connection of neon lamp 270 and variable resistor 372. The photocell resistance element 373 of photocoupler 369 is connected via conductors 374 and 376 to output terminal 378. The other side of the photocell resistance 373 is connected via conductor 375 to the gate lead of a TRIAC 381. TRIAC 381 is connected by conductors 383, 382 and 376 between terminal 378 and defrost control 384. The defrost control 384 is connected to terminal 380 by conductor 386.

One terminal of a neon lamp element 390 of a third photocoupler 389 is connected by conductor 388 to the conductor 383 side of TRIAC 381. The other terminal of the neon lamp 390 is connected by conductors 392, 394 and 376, and resistor 393 to output load terminal 378. The photocell resistance element 391 of third photocoupler 389 is connected between output load resistance terminal 378 by conductors 395 and 376, and through conductor 396 to the gate lead of a second TRIIC 397. TRIAC 397 is connected between output load terminal 378 and a refrigeration control means 401 by conductors 398, 399 and 376. The other side of the refrigeration control circuit 401 is connected to the output load terminal 380 by means of conductors 400 and 386.

Referring now to FIGS. 3, 4, 13, 14 and 24, the operation of the frost detector 152 and control circuit 320 for controlling the defrost of the refrigeration equipment will be explained. As hereinabove previously described, frost detector 152 is attached to coil 78, and as the ice or frost 124 builds up on the surface of coil 78, the intensity of the electromagnetic radiation of preferred wavelength transmitted by emitter (LED) 153 will decrease at the detector (LSCR) 154 as the thickness of the ice or frost layer 124 increases due to the absorption or scattering phenomena previously described. The threshold gate voltage of the detector (LSCR) 154 can be set to a desired value by variable resistor 359. As the intensity of the electromagnetic radiation, passing through transparent section or lens 161, decreases below a predetermined value, the LSCR 154 is gated off and ceases conduction. When LSCR 154 ceases to conduct, a voltage appears across neon lamp 370 of photocoupler 369 and charges capacitor 367. When voltage appears across the terminals of the neon lamp 370, it conducts and radiates light to photocell resistance element 373. In accordance with conventional photocell technology, the impedance of the photocell resistance 373 is reduced to a low value, thereby closing the circuit between terminal 378 and the gate lead of TRIAC 381 through conductors 374 and 375, and the photocell resistor 373. The TRIAC 381 conducts and closes the load power circuit to the defrost control means 384. With a voltage appearing across the defrost control means 384, conventional defrost mechanisms, such as defrost heaters and the like, are energized and begin the defrost cycle to defrost the ice or frost 124 from evaporator coils 78.

Capacitor 367 functions to store an electrical charge in order to maintain the necessary voltage and conducting current to neon light 370 during the half-cycle in which there is no conduction through diode 364. A time delay for operating lamp 370 can be effected by making the RC time constant of capacitor 367 and resistor 372 large and may be adjusted by variable resistor 372.

Thus, even after the ice or frost has been melted and the defrost cycle has physically been accomplished, an additional "defrost time" can be added to the defrost cycle. The defrost cycle will be terminated when the LSCR 154 resumes conduction after the defrost cycle is complete, including any time delay created by the RC network of capacitor 367 and variable resistance 372.

When TRIAC 381 is conducting, the neon lamp 390 of photocoupler 389 does not conduct and, accordingly, the photocell resistance 391 of photocoupler 389 remains high, thus gating off TRIAC 397, which in turn switches off the application of load power from terminals 378 and 380 to the refrigeration control means 401. Thus, while the defrost control means 384 is operational, the circulation of refrigerating fluid through the evaporator coils of the refrigeration equipment may be shut off to enhance the defrost process. Referring to FIG. 7, the refrigeration control means may be compressor 86 and/or solenoid valves 97 of the first and third evaporator units 75 and 77.

When LSCR 154 ceases conduction to begin the defrost cycle, a voltage also appears across neon lamp 350 of photocoupler 348 and causes the neon lamp 350 to conduct, thereby lowering the photocell resistance 352 of photocoupler 348 to a small value and effectively putting resistors 355 and 357 in parallel. Accordingly, variable resistor 355 may be set to a selected value to establish a higher threshold voltage on the gate lead of LSCR 154 that will determine at what level of received radiation the LSCR will again begin to conduct in response to a higher intensity or energy level of electromagnetic radiation received from emitter (LED) 153 because of the melting and removal of the frost 124. Capacitor 342 cooperates with diode 339 to maintain a voltage applied to neon lamp 350 during the half-cycle in which there is no conduction through diode 339. The thermostat or temperature responsive switch 357 will open upon the air temperature reaching a preselected temperature, thus gating on LSCR 154 and terminating the defrost cycle.

When LSCR 154 begins to conduct after the defrost cycle, neon lamp 350 of photocoupler 348 ceases conduction and photocell resistor 352 returns to a high impedance value, thus leaving the only effective resistance in the circuit as resistor 359, which determines the threshold gate level of LSCR 154 at which the defrost cycle will be initiated, as hereinabove described. In addition, when LSCR 154 begins to conduct, neon lamp 370 of photocoupler 369 ceases conduction, and the photocell resistance 373 returns to a high impedance value, thus gating off TRIAC 381 and switching off the defrost control 384. However, when TRIAC 381 stops conduction, a voltage appears across neon lamp 370 of photocoupler 389, thus causing neon lamp 390 to conduct and lower the photocell resistance 391 to a low impedance value and gating on TRIAC 397. The conduction of TRIAC 397 applies the load voltage appearing across terminals 378 and 380 to the refrigeration control means 401 for resuming the refrigeration cycle.

The above description of the operation of the ice and frost detector 152 and an associated control circuit 320 has been described with relation to operating conventional defrost control means 384 during which time the refrigeration cycle is shut off by means of refrigeration control means 401. However, the defrost control 384 could activate sources of electromagnetic radiation of preselected wavelengths that are only absorbed by frost, such as radiation sources 81 and 83 hereinabove described in connection with FIG. 7.

While the control circuitry 320 has been described above in specific relation to the frost-detecting apparatus 152, any of the previous embodiments 102, 134 or 140 may be utilized with circuitry 320, provided the detector utilizes the absorption or scattering technique or phenomena described above in connection with FIGS. 3 and 4. If the technique to be utilized involves the reflective scattering techniques above described in connection with FIGS. 5, 6, 8, 9 and 10, then a slightly different circuit 410 (see FIG. 25) must be utilized. In FIG. 25, control circuit 410 comprises nearly the identical elements and circuit components of control circuit 320. Accordingly, in FIG. 25 the elements that are identical to those in FIG. 24 are given the same reference numbers and the changed elements have new reference numbers.

Referring now to FIGS. 8, 9, 10, 11, 12, 24 and 25, control circuit 410 comprises an input power circuit to emitter (LED) 125 identical to that in FIG. 24. The anode of the detector (LSCR) 128 is connected directly to input terminal 321 by conductor 323. Resistor 363 is connected between conductor 324 and the junction of conductors 368 and 362. The anode of diode 364 is connected by conductor 412 to the output lead 361 of the LSCR 128. Diode 339, capacitor 342, photocoupler 348, and resistors 345 and 355 and all associated interconnecting conductors have been removed. Conductors 353 and 324 are interconnected to provide power to one terminal of lamp 370 of photocoupler 369. In addition, a thermostat or temperature responsive switch 357 is connected in parallel with the gate resistor 359. All other elements of the circuit are identical to that described in connection with FIG. 24.

As hereinabove described, the frost detector 102, 134, 140 or 152, utilizing the reflective scattering technique previously discussed in connection with FIGS. 5 and 6, will detect an increase in thickness of frost 124 by an increase in the intensity of radiation reflectively scattered and detected by detector 128. The threshold gate voltage of the detector (LSCR) 128 can be set to turn on the LSCR at a desired bias value by adjusting the gate bias potentiometer 359. As the intensity of the electromagnetic radiation reflectively scattered from frost 124 increases above a predetermined value, the LSCR 128 is gated on and starts to conduct. When LSCR 128 conducts, voltage (the voltage output of rectifier 326) is applied to diode 364 which also conducts and applies the voltage across the terminals of the neon lamp 370 of photocoupler 369 as hereinabove described in connection with FIG. 24, thus activating TRIAC 381 and actuating defrost control means 384 as previously described. TRIAC 397 is disabled and refrigeration control means 401 is shut off during the defrost cycle as hereinabove described. When the frost is melted by the defrost means 384, no electromagnetic radiation will be reflectively scattered and detected by detector 128, thus causing LSCR 128 to cease conduction, in turn causing diode 364 to cease conduction and turning off the neon lamp 370 of photocoupler 369. When lamp 370 is extinguished, the photocell resistance 373 goes to a high impedance value, gating off TRIAC 381 and switching off the defrost control 384, as hereinabove described. When TRIAC 381 is disabled, TRIAC 397 is gated on and conducts, thereby switching on refrigeration control means 401, as previously described in connection with FIG. 24. Temperature sensitive switch 357 closes and gates off LSCR 128 upon the air temperature reaching a predetermined temperature level, thereby terminating the defrost cycle.

In the above described control circuits 320 and 410, it is readily seen that the photodetector (LSCR), 154 and 128, respectively, operate in conjunction with an electrical control circuit comprising defrost power switch means comprising TRIAC 381 and a defrost coupling switch means 369 interconnected to the defrost power switch means above defined and operable in response to the control signal generated by the LSCR 154 or 128, i.e., when the LSCR 154 ceases to conduct or when LSCR 128 starts to conduct. The RC network comprising capacitor 367 and resistor 372 further acts as a time delay circuit for holding the defrost coupling switch means 369 closed for a preselected time period after completion of the defrost cycle. In addition, the circuit can be described and further defined as including a refrigeration power switch means comprising TRIAC 397 and a refrigeration coupling switch means 389 interconnected between the defrost power switch means or TRIAC 381 and the refrigeration coupling switch 389 and operating to energize the refrigeration power switch means, TRIAC 397, when the defrost power switch means, TRIAC 381, is de-energized.

Figure 16:
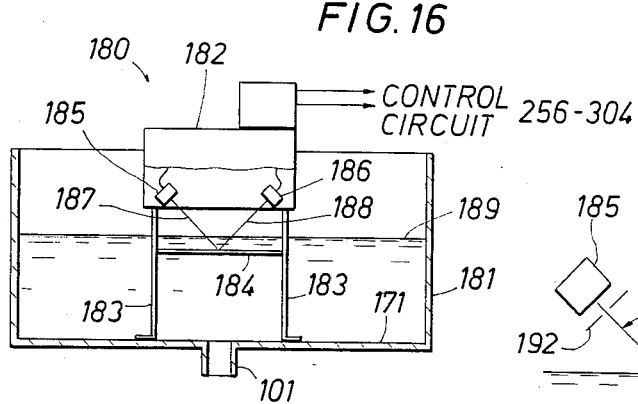
FIG. 16 is a vertical cross-sectional view of a liquid level detector apparatus utilizing the present invention.

Referring now to FIG. 16, the invention may also be utilized in the form of a detection apparatus for detecting the level of a liquid 189 in a container 181. In FIG. 16, a liquid level detector 180 is shown disposed in the liquid container compartment 181. The detector housing 182 is positioned within container 181 by means of any suitable mounting means such as legs 183. Housing 182 carries an emitter 185 for transmitting a beam of electromagnetic radiation having an absorption narrow band of wavelengths and a selected intensity and a detector 186 for receiving and detecting the electromagnetic radiation. The emitter 185 and detector 186 are connected by suitable electrical conductors to a control circuit 256 or 304, which will be hereinafter further described. A reflecting surface 184 is disposed in container 181 and disposed in a spaced-apart relationship from housing 182 carrying the emitter 185 and detector 186. The electromagnetic radiation transmitted by emitter 185 follows the path 187 and strikes the reflecting surface 184 and is thereby reflected to and received by detector 186 along path 188.

As long as the level of a liquid 189 remains below the reflecting surface 184, detector 186 receives substantially all of the reflected electromagnetic radiation from emitter 185. However, as the level of liquid 189 rises above reflecting surface 184, the intensity of the electromagnetic radiation, having a wavelength preselected for absorption by the liquid 189, received by detector 186 will decrease as the radiation energy is absorbed by liquid 189. Accordingly, detector 186 will detect the change in the intensity of the electromagnetic radiation, thereby detecting the level of the liquid 189 after it rises above the level of the reflecting surface 184.

The above described liquid level detector 180 has particular utility as a stopped drain detector for use in connection with refrigeration equipment. In such an application, the container 181 would be a portion of the refrigerator housing having a drain 101 through which condensate water may be discharged from the refrigeration unit. As a stopped drain detector 180, the housing 182 would be supported on free standing legs 183 that could be positioned directly above the drainpipe 101. The placement of reflecting surface 184 could be selected in order to detect the level of the water 189 within the compartment 181 at a desired level. The reflecting surface could also be the floor 171 of container 181. If the drain 101 becomes clogged, and water begins to accumulate and back up in the compartment 181, the detector 180 would detect the level of the rising water 189, thereby initiating an appropriate alarm for indicating a stopped drainpipe 101.

Figure 22:
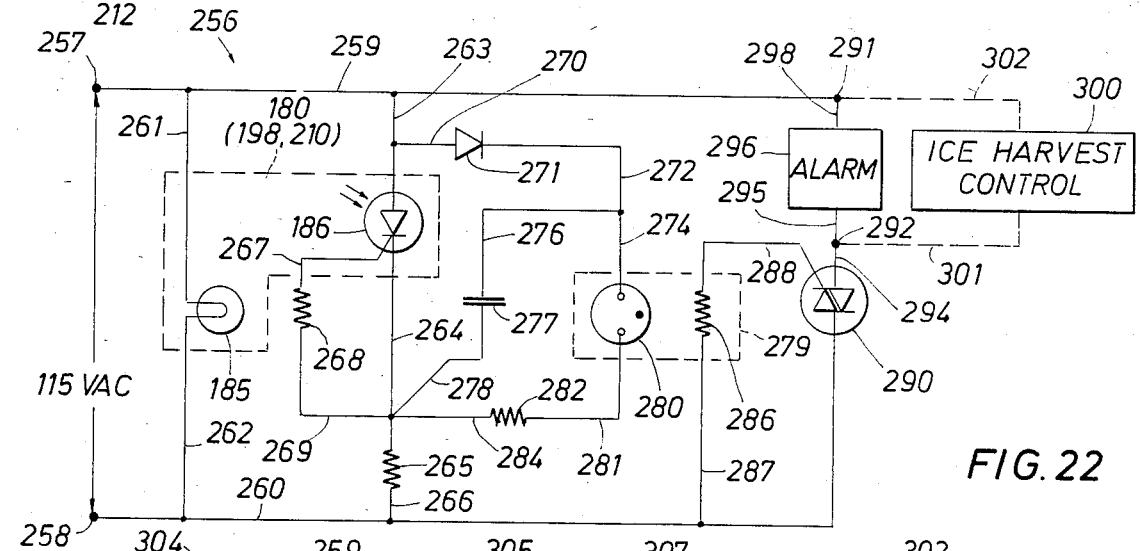
FIG. 22 is a schematic representation of a control circuit for detecting and indicating a liquid level or the physical change in state of a substance.

Referring to FIGS. 16 and 22, a schematic of control circuit 256 is shown in detail. Input terminals 257 and 258 are connected across a source of input power, such as 115 VAC. A conventional lamp or light source 185 (corresponding to emitter 185 of detector 180) is connected across terminals 257 and 258 by means of conductors 261 and 262. A photodetector 186, such as a conventional LSCR, selected to respond to a preselected wavelength of electromagnetic energy absorbed by the liquid that is to be detected in container 181 is connected across terminals 257 and 258 by conductors 256, 263, 264, 266 and 260, and resistor 265. The gate lead of LSCR 186 is connected via conductors 267 and 269 and resistor 268 to the conductor 264 side of resistor 265. The anode terminal of a diode 281 is connected to the anode side of LSCR 186 by conductor 270. The cathode side of diode 271 is connected by conductors 272 and 274 to one terminal of a neon lamp element 280 of photocoupler 279. The other terminal of the neon lamp 280 is connected via conductors 281 and 284 and resistor 282 to the conductor 264 side of resistor 265. The photocell element 286 of the photocoupler 279 is connected to terminal 258 by means of conductors 287 and 260, and to the gate lead of a TRIAC 290 by means of conductor 288. TRIAC 290 is connected to power input terminal 258 by conductor 260 and to output terminal 292 by means of conductor 294 and to an alarm 296 by means of conductor 295. The alarm 296 is connected to power output terminal 291 through conductor 298.

As long as the level of liquid 189 is below the reflecting surface 184, the electromagnetic radiation having a narrow band of wavelengths emitted by source 185 will impinge upon LSCR 186 at a maximum intensity, thereby causing LSCR 186 to conduct and preventing the conduction of neon lamp 280 of photocoupler 279. As long as neon lamp 280 is not conducting, the photocell resistance 286 remains at a high impedance value, thereby gating off TRIAC 290 and disabling alarm 296. However, as the level of liquid 189 rises above reflecting surface 184, the intensity of the reflected electromagnetic radiation will decrease, because of the absorption by the liquid 189, until a predetermined threshold level of the LSCR 186 is reached and the LSCR ceases conduction. The threshold level for terminating conduction of the LSCR 186 is determined by the value of resistor 268. A capacitor 277 is connected in shunt across the neon lamp 280 and resistor 282 by means of conductors 276 and 278. The function of the capacitor 277 is to insure sufficient voltage and current for continuing the conduction of the neon lamp 280 during the half-cycle when diode 271 is not conducting. When LSCR 186 ceases conduction, a voltage appears across neon lamp 280, causing it to conduct and lowering the resistance of the photocell resistor 286 to a low impedance value, thereby allowing current to flow through conductors 287 and 288 for gating on TRIAC 290. When TRIAC 290 conducts, voltage is applied from power input terminal 258 through conductors 260, TRIAC 290, conductors 294 and 295, and output terminal 292 to alarm 296, thus actuating the alarm. Alarm 296 may be any conventional alarm device such as a warning light, a bell or a buzzer or the like.

Figure 23:
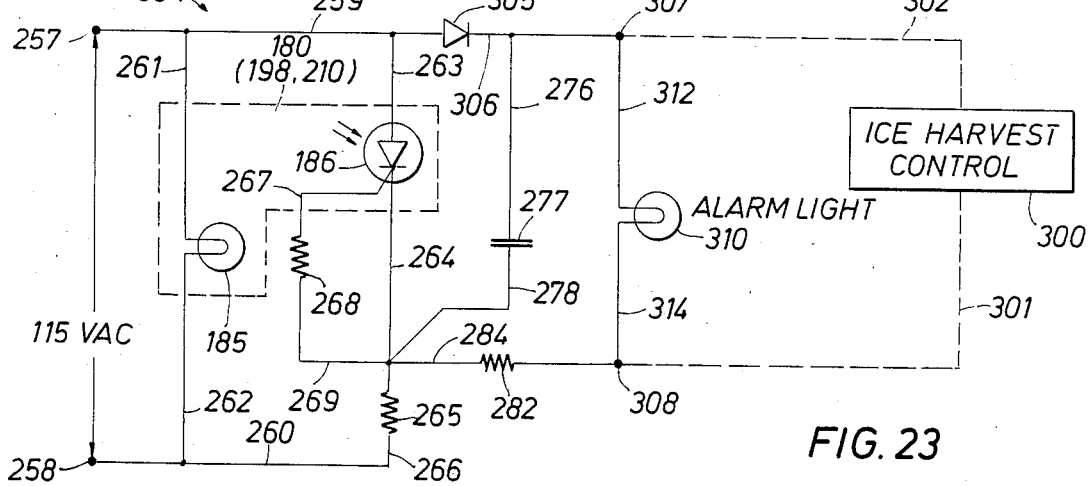
FIG. 23 is a schematic representation of another control circuit for detecting and indicating a liquid level or a change in physical state of a substance.

An alternative control circuit 304 for use with detectors 180, 198 or 210 is shown in the schematic of FIG. 23. Circuit 304 is similar to circuit 256, and identical elements or components utilize the same reference numbers. 257 and 258 and applied to the emitter or source of electromagnetic radiation having a narrow band of wavelength 185. A photodetector device (LSCR) 186, selected to receive and detect the electromagnetic radiation, is connected across terminals 257 and 258 and in parallel with emitter 185 by means of conductors 263 and 259 (connected to the anode of LSCR 186) and conductors 264, 266 and 260, and resistor 265 (connected to the cathode of the LSCR 186). The gate lead of LSCR 186 is connected through conductors 267 and 269 and resistor 268 to the conductor 264 side of resistor 265. The anode terminal of a diode 305 is connected to terminal 257 by conductor 259. The cathode side of diode 305 is connected to output terminal 307 by conductor 306. Output terminal 308 is connected to the conductor 264 side of resistor 265 by conductor 284 and resistor 282. An alarm lamp 310 is connected between output terminals 307 and 308 by conductors 312 and 314.

In operation, the electromagnetic radiation emitted by radiation source 185 is reflected from reflecting surface 184, as hereinabove described with regard to FIG. 16, and is directed to impinge upon LSCR 186 which receives the electromagnetic radiation and detects any change in the intensity of the radiation. As long as the level of the liquid 189 in container 181 is below the reflecting surface 184, maximum intensity of the radiation is received by LSCR 186. However, as the level of liquid 189 rises above reflecting surface 184, the radiation passing through the liquid and reflected from surface 184 is increasingly absorbed by the liquid 189 and the intensity of the electromagnetic radiation striking LSCR 186 decreases. As the intensity of the radiation decreases, a threshold cut-off level, determined by the gate bias applied by resistor 268, is reached at which time LSCR 186 stops conduction. When LSCR 186 stops conducting, voltage is applied across diode 305 to terminal 307, causing lamp 310 to conduct. Lamp 310 functions as an alarm lamp to indicate when LSCR 186 stops conducting, thereby indicating that the liquid level has risen above the reflecting surface 184. In addition, there may be included a capacitor 277 connected in parallel across lamp 310 and resistor 282 by means of conductors 276 and 278.

Figure 17:
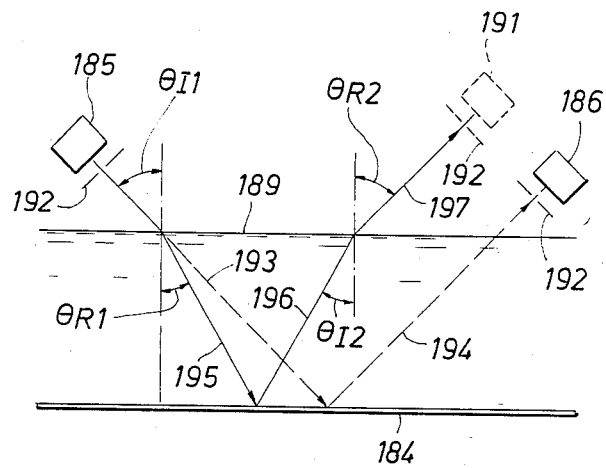
FIG. 17 is a diagrammatic view showing another embodiment of the liquid level detecting apparatus according to this invention.

Referring now to FIG. 17, another technique for the detection of a liquid level is illustrated. An emitter 185 transmits electromagnetic radiation of an absorption narrow band of wavelengths along a path 193 which is reflected from a reflecting surface 184 along path 194 and received by a detector 186. However, a mask 192 having a small aperture therein permits the transmission of a very narrow beam of electromagnetic radiation by emitter 185 which follows the path 193-194, and another mask 192 associated with detector 186 is provided to admit only a narrow portion of the beam 194 reflected from surface 184 to detector 186. If the electromagnetic radiation shifts from the precise path defined by 193-194, the mask 192 associated with detector 186 will block the radiation beam and prevent detection of the beam by detector 186. Accordingly, as the level of a liquid 189 rises above reflecting surface 184, the electromagnetic radiation emitted by source 185 will strike the surface of liquid 189 at an angle of incidence shown by the angle identified as $\theta_{I1}$ and will be refracted from its original path 193 to follow a new path 195 within liquid 189. The angle of refraction of the electromagnetic radiation beam passing through liquid 189 and following path 195 is shown by the angle $\theta_{R1}$. The beam will be reflected from surface 184 along a path 196 where it will again be incident upon the surface of liquid 189 at an angle identified by $\theta_{I2}$. However, the electromagnetic radiation beam, upon leaving liquid 189 and entering the air, will again be refracted by the angle identified as $\theta_{R2}$ and travel along beam path 197. Beam path 197 is shifted from the original beam path 194 by refraction in passing through liquid 189, and no electromagnetic radiation will reach detector 186 because of mask 192 associated therewith. Accordingly, utilizing either of the control circuits 256 or 304, hereinabove described with regard to FIGS. 16, 22 and 23, the liquid level detector 180 will respond to the decrease in the received intensity of the light beam and actuate an appropriate alarm indicating the presence of the liquid 189 at a predetermined level. In addition, a second detector 191 may be provided with an associated mask 192 for receiving the refracted electromagnetic beam 197 for initiating control means (not shown) for further controlling the level of the liquid 189, or as an alternative for the first detector 186.

As hereinabove mentioned, the instant invention, utilizing the transmission of a beam of electromagnetic radiation having a narrow band of wavelength and selected intensity through a substance or material where the radiation beam is absorbed or scattered by the material in direct relation to the thickness of the material, can also be utilized for detecting the physical change in state of a substance, i.e., from a liquid to a solid, from a solid to a liquid, from a solid to a gas, etc. One particular application of such a detection of physical change in state of a substance can be the application of the instant invention to the detection of the physical change in state of a liquid, such as water, to a solid upon freezing, as in the process for manufacturing ice. Accordingly, referring to FIG. 18, such a process and an apparatus 198 for detecting the physical change in state of a substance will be described. In FIG. 18, a container 199 is provided having therein a liquid 202, such as water, the container having a reflecting surface 201 disposed within the container. A supporting bracket 203 carries a source of electromagnetic radiation or emitter 206 transmitting electromagnetic radiation of an absorption narrow band of wavelengths and intensity that is absorbed by the water 202, and a detector 207 for detecting the electromagnetic radiation in accordance with the theory hereinabove discussed with regard to other embodiments of the invention. The electromagnetic radiation is transmitted by emitter 206 and follows beam path 208 and is reflected from the reflecting surface 201 and directed to detector 207 along path 209. The bracket support member 203 may be conventionally attached to a frame structure 205 by means of conventional attaching means such as screws 204. Emitter and detector 206 and 207, respectively, are connected to an appropriate control circuit 256 or 304.

As previously described with regard to FIG. 1, the wavelengths of electromagnetic radiation that are absorbed by a substance in a solid state is different from the wavelengths at which the substance absorbs the electromagnetic radiation in its liquid state. Accordingly, the wavelength of the electromagnetic radiation emitted by source 206 will be selected to contain the wavelengths that will be absorbed by the ice upon freezing of the water 202, but will not be absorbed by the water 202 in a liquid state. Accordingly, while the water 202 remains in a liquid state, the water will absorb only a very small portion of the radiation of an absorption narrow band of wavelengths, and the detector 207 will accordingly detect a maximum intensity of the reflected radiation.

Referring now to FIGS. 18, 22 and 23, by substituting emitter 206 for source 185 and substituting detector 207 for photodetector 186 in control circuits 256 and 304, the control circuits will function to indicate the change in state of the water 202 from a liquid to a solid, ice, upon freezing. As long as water 202 remains in its liquid state, the detector (LSCR) 207 conducts since a maximum intensity of the reflected radiation from emitter 206 is received. When the water 202 changes to a solid, however, the ice will absorb the electromagnetic radiation of an absorption narrow and of wavelengths, emitted by source 206, thereby decreasing the intensity of the radiation detected by LSCR 207, causing the LSCR to stop conducting and actuating alarm 296, as hereinbefore previously described. In addition, or in place of alarm 296, an ice harvest control 300 may also be actuated to initiate harvest of the ice 202 by suitable conventional means (not shown). Ice harvest control 300 may be inserted in the control circuit 256 by means of conductors 301 and 302 connected across terminals 291 and 292, and into control circuit 304 by means of conductors 301 and 302 connected across terminals 307 and 308. Of course, if an alarm is not necessary, then the ice harvest control 300 would replace the alarm 296 or 310. Similarly, the control circuit 304 could be utilized in place of control circuit 256, and its operation would be identical to that hereinbefore described.

Figure 19:
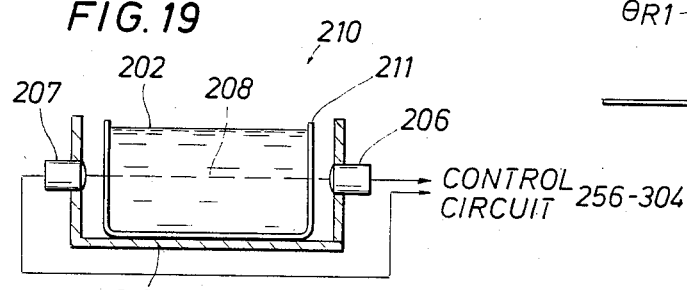
FIG. 19 is a vertical cross-sectional view of another embodiment of an apparatus for detecting the physical change in state of a substance according to the present invention.

FIG. 19 illustrates yet another means 210 of detecting a physical change in state of a substance. A container 211 is provided having therein a liquid such as water 202. Container 211 is constructed of a transparent material that freely transmits a beam of electromagnetic radiation of an absorption narrow band of wavelengths without absorption. A source 206 of electromagnetic radiation containing an absorption narrow band of and intensity is provided and placed adjacent one side of the transparent container 211 and transmits a beam of electromagnetic radiation along a path 208 through container 211 and the water 202. A detector 207 is positioned on the opposite side of container 211 to intercept the beam of radiation 208 and detect the intensity of the radiation. Emitter 206 and detector 207 may be appropriately supported by a mounting bracket 212 and connected to control circuits 256 or 304 by means of appropriate conductors. The operation of the change in state detector 210 in conjunction with control circuits 256 and 304, as shown in FIGS. 22 and 23, is identical to the hereinabove described operation for the detector 198 shown in FIG. 18. Of course, other arrangements of components and selected wavelengths would be necessary for detecting other physical changes of state.

All of the circuits above described in FIGS. 20, 21, 22, 23, 24 and 25 can also be integrated as a single integrated circuit in conjunction with the detector of the control circuits.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An improved apparatus for more consistent and sensitive detection of ice or frost accumulation on a refrigerator evaporator coil chracterized by passing electromagnetic radiation through ice or frost accumulated on the evaporator coil, detecting changes in the intensity of the electromagnetic radiation passing through the frost and initiating a defrost cycle in response to the detected changes in the electromagnetic radiation intensity, the improvement comprising:
   (a) a radiation means for reducing ambient radiation variation effects and increasing thermal and voltage stability by directing at said frost, electromagnetic radiation of a narrow band of wavelengths selected from the absorption and scattering spectrum of said frost and having a bandwidth substantially equivalent to the bandwidth of the electromagnetic radiation emitted by electrons traversing the energy gap of a semiconductor device;
   (b) a detection means for detecting the change in intensity of said electromagnetic radiation due to scattering and absorption from the frost;
   (c) a body member supporting said radiation means and said detection means in a spaced-apart relationship;
   (d) a mounting means adapted for mounting said body member adjacent to said evaporator coil for detecting decreases in intensity of said electromagnetic radiation in response to increases in frost accumulation thereon; and
   (e) a frost forming member interposed between said radiation means and said detection means for accumulating frost thereon directly proportional to the frost accumulation on the evaporator coil and permitting substantially unhindered transmission of said electromagetic radiation when no frost is present thereon.

2. The detecting apparatus as defined in claim 1, wherein said frost-forming member comprises a generally L-shaped metal strip, one leg of said L-shaped metal strip adapted for heat transfer contact with said evaporator coil surface, said other leg projecting from said evaporator coil and having an aperture therethrough for passing said electromagnetic radiation therethrough.

3. The detecting apparatus as defined in claim 2, wherein said aperture in said L-shaped metal strip is filled with a transparent material for freely transmitting said electromagnetic radiation.

4. The detecting apparatus as defined in claim 3, wherein said body member is a generally U-shaped body integrally molded of a plastic material and carrying imbedded therein said radiation means and said detection means in an opposed space-apart relationship and attached to said other leg of said L-shaped metal strip for positioning said radiation means and said detection means on opposite sides of said transparent material filling said aperture in said other leg of said L-shaped metal strip.

5. The detecting apparatus as defined in claim 4, wherein said transparent material filling said aperture forms a convex lens for converging said electromagnetic radiation passing therethrough.

6. The improved apparatus as defined in claim 1, wherein said electromagnetic radiation of a narrow band of wavelengths contains the wavelengths at which a change in intensity of said electromagnetic radiation in the presence of frost is due to the absorption effect in said frost.

7. The improved apparatus as defined in claim 1, wherein said electromagnetic radiation of a narrow band of wavelengths contains the wavelengths at which a change in intensity of said electromagnetic radiation in the presence of frost is due to the scattering effect in said frost.

8. The improved apparatus as defined in claim 1, wherein said semiconductor device is a light emitting diode.

9. An improved apparatus for more consistent and sensitive detection of ice or frost accumulation on a refrigerator evaporator coil characterized by passing electromagnetic radiation through ice or frost accumulated on the evaporator coil, detecting changes in the intensity of the electromagnetic radiation passing through the frost and initiating a defrost cycle in response to the detected changes in the electromagnetic radiation intensity, the improvement comprising:
 (a) a radiation means for reducing ambient radiation variation effects and increasing thermal and voltage stability by directing said frost electromagnetic radiation of a narrow band of wavelengths selected from the absorption and scattering spectrum of said frost and having a bandwidth substantially equivalent to the bandwidth of the electromagnetic radiation emitted by electrons traversing the energy gap of a semiconductor device;
 (b) a detection means for detecting the change and intensity of said electromagnetic radiation due to scattering and absorption from the frost; and
 (c) a circuit means cooperating with said detection means for initiating and terminating operation of refrigerator defrost equipment for removing the accumulation of frost on said evaporator coil, said detection means comprising a photodetector selected to receive and detect changes in be intensity of said electromagnetic energy and for generating a control signal in response to a preselected change in said intensity level, said circuit means including,
  (i) a defrost power switch means for applying electrical power to said refrigerator equipment when said power switch means is energized,
  (ii) a defrost coupling switch means interconnected between said detector and said defrost power switch means and responsive to said control signal generated by said detector to energize said defrost coupling switch means and said defrost power switch means, and
  (iii) a time delay circuit interconnected between said detector and said defrost coupling switch means and cooperating with said coupling switch means for holding said coupling switch means in an energized state for a preselected time period after initiation of the defrost cycle by said defrost equipment.

10. The improved apparatus as defined in claim 9, wherein said radiation means is a light emitting diode.

11. An improved apparatus for more consistent and sensitive detection of ice or frost accmulation on a refrigerator evaporator coil characterized by passing electromagnetic radiation through ice or frost accumulated on the evaporator coil, detecting changes in the intensity of the electromagnetic radiation passing through the frost and initiating a defrost cycle in response to the detected changes in the electromagnetic radiation intensity, the improvement comprising:
 (a) a radiation means for reducing ambient radiation variation effects and increasing thermal and voltage stability by directing said frost electromagnetic radiation of a narrow band of wavelengths selected from the absorption and scattering spectrum of said frost and having bandwidth substantially equivalent to the bandwidth of the electromagnetic radiation emitted by electrons traversing the energy gap of a semiconductor device;
 (b) a detection means for detecting the change and intensity of said electromagnetic radiation due to scattering and absorption from the frost;
 (c) a body member supporting said radiation means and said detection means in a spaced-apart relationship;
 (d) a mounting means adapted for mounting said body member adjacent to said evaporator coil for detecting decreases in intensity of said electromagnetic radiation in response to increases in frost accumulation thereon; and
 (e) a frost forming member interposed between said radiation means and said detection means for accumulating frost thereon directly proportional to the frost accumulation on the evaporator coil and permitting substantially unhindered transmission of said electromagnetic radiation when no forst is present thereon, said frost-forming member comprising a generally L-shaped metal strip metal strip, one leg of said L-shaped metal strip adapted for heat transfer contact with said evaporator coil sufface, said other leg projecting from said evaporator coil surface and having an aperture therethrough for passing said electromagnetic radiation therethrough.

12. The detecting apparatus as defined in claim 11, wherein said aperture in said L-shaped metal strip is filled with a transparent material for feely transmitting said electromagnetic radiation.

13. The detecting apparatus as defined in claim 11, wherein said body member is a generally U-shaped body integrally molded of a plastic material and curing imbedded therein, said radiation means and said detection means in an opposed spaced-apart relationship and attached to said other leg of said L-shaped metal strip for positioning said radiation means and said detection means on opposite sides of said other leg of said L-shaped metal strip.

14. The detecting apparatus as defined in claim 12, wherein said transparent material filling said aperture forms a convex lens for converging said beam of electromagnetic radiation.

15. An improved apparatus for more consistent and sensitive detection of ice or frost accumulation on a refrigerator evaporator coil characterized by passing electromagnetic radiation through ice or frost accumulated on the evaporator coil, detecting changes in the intensity of the electromagnetic radiation passing through the frost and initiating a defrost cycle in response to the detected changes in the electromagnetic radiation intensity, the improvement comprising:
 (a) a radiation means for reducing ambient radiation variation effects and increasing thermal and voltage stability by directing said frost electromagnetic radiation of a narrow band of wavelengths selected from the absorption and scattering spectrum of said frost and having a bandwidth substantially equivalent to the bandwidth of the electromagnetic radiation emitted by electrons traversing the energy gap of a semiconductor device;

(b) detection means for detecting the change and intensity of said electromagnetic radiation due to scattering and absorption from the frost, said detection means comprising a photodetector selected to receive and detect changes in the intensity of said electromagnetic energy and for generating a control signal in response to a preselected change in said intensity level;

(c) a body member supporting said radiation means and said detection means in a spaced-apart relationship;

(d) a mounting means adapted for mounting said body member adjacent to said evaporator coil for detecting decreases in intensity of said electromagnetic radiation in response to increases in frost accumulation thereon; and (e) a circuit means cooperating with said detection means for initiating and terminating operation of refrigerator defrost equipment for removing the accumulation of frost on said evaporator coil, said circuit means including, (i) a defrost power switch means for applying electrical power to said refrigerator system defrost equipment when said power switch means is energized, (ii) defrost coupling switch means interconnected between said detector and said defrost power switch means and responsive to said control signal generated by said detector to energize said defrost coupling switch means and said defrost power switch means, and (iii) a time delay circuit interconnected between said detector and said defrost coupling switch means and cooperating with said coupling switch means for holding said coupling switch means in an energized state for a preselected time period after initiation of the defrost cycle by said defrost equipment.

16. The detecting apparatus as defined in claim 15, wherein said circuit means further includes a detector biasing switch means cooperating with the input bias circuit of said detector and said time delay circuit for disabling said photodetector until termination of the defrost cycle and said preselected time delay.

17. The detecting apparatus as defined in claim 16, wherein said radiation means is a radiation-emitting semiconductor and said photodetector is a radiation-emitting silicon controlled rectifier.

18. The detecting apparatus as defined in claim 15, wherein said radiation means is a light emitting diode.

* * * * *

UNITED STATES PATENT AND TRADEMARK OFFICE
CERTIFICATE OF CORRECTION

PATENT NO. : 4,593,533
DATED : June 10, 1986
INVENTOR(S) : Richard H. Alsenz

It is certified that error appears in the above—identified patent and that said Letters Patent is hereby corrected as shown below:

Column 31, line 42, delete "be" and insert therefor --the--.

Column 32, line 10, after "having" insert --a--.

Column 32, line 30, delete "forst" and insert therefor --frost--.

Column 32, line 32, delete second repetition of "metal strip".

Column 32, line 41, delete "feely" and insert therefor --freely--.

Signed and Sealed this

Sixteenth Day of December, 1986

Attest:

DONALD J. QUIGG

*Attesting Officer*  *Commissioner of Patents and Trademarks*